(12) United States Patent
Pedrini

(10) Patent No.: US 7,866,517 B2
(45) Date of Patent: Jan. 11, 2011

(54) VEHICLE-MOUNTED EQUIPMENT CARRIER

(76) Inventor: Fabio Pedrini, Via Zamboni 1/Scala-A, Piano-1, Interno-3, I-40125 Bologna (IT)

( * ) Notice: Subject to any disclaimer, the term of this patent is extended or adjusted under 35 U.S.C. 154(b) by 1215 days.

(21) Appl. No.: 10/533,170

(22) PCT Filed: Oct. 28, 2003

(86) PCT No.: PCT/IB03/04773

§ 371 (c)(1),
(2), (4) Date: Oct. 19, 2005

(87) PCT Pub. No.: WO2004/039635

PCT Pub. Date: May 13, 2004

(65) Prior Publication Data

US 2006/0138186 A1    Jun. 29, 2006

(51) Int. Cl.
B60R 9/06 (2006.01)
B60R 9/10 (2006.01)
(52) U.S. Cl. .................. 224/532; 224/572; 224/924
(58) Field of Classification Search .............. 224/497, 224/502, 504, 505, 512, 531, 532, 572, 924, 224/162; D12/408, 412; 410/100; 403/97, 403/110; 248/227.4, 230.9, 222.14, 230.5
See application file for complete search history.

(56) References Cited

U.S. PATENT DOCUMENTS

| | | |
|---|---|---|
| 3,464,608 A | 9/1969 | Rodriguez |
| 3,655,082 A | 4/1972 | Garrett |
| 3,659,762 A | 5/1972 | Kravitz |
| 3,675,833 A | 7/1972 | Barr |
| 3,695,469 A | 10/1972 | Arant |
| 3,710,999 A | 1/1973 | Allen |
| 3,720,333 A | 3/1973 | Vaughn |
| 3,754,672 A | 8/1973 | Blomquist et al. |
| 3,837,513 A | 9/1974 | Adamek |
| 3,877,622 A | 4/1975 | McLain |
| 3,891,132 A | 6/1975 | Chandler |
| 3,994,425 A | 11/1976 | Graber |
| 4,046,297 A | 9/1977 | Bland |
| RE29,840 E | 11/1978 | Wasserman |
| 4,298,151 A * | 11/1981 | O'Connor .................. 224/329 |

(Continued)

FOREIGN PATENT DOCUMENTS

DE    4131854    4/1993

(Continued)

Primary Examiner—Justin M Larson
(74) Attorney, Agent, or Firm—Boyle Fredrickson S.C.

(57) ABSTRACT

An equipment carrier for mounting onto a rear component of a vehicle structure, such as a vehicle trunk lid or door, comprises a frame having lower engagement elements engageable with a lower area of the vehicle component, a structure connected to the frame for carrying one or more items of equipment, at least one vehicle engaging member, connected to the frame, for engaging the vehicle component at a position above said lower area, a strap member having upper engagement elements for engagement with an upper area of the vehicle component, and at least one support connected to the frame, provided with a strap engaging and tensioning mechanism, which is engaged by the strap member and can be controlled for tensioning the strap member in order to tighten the upper and lower engagement elements onto the upper and lower areas of the vehicle component.

36 Claims, 27 Drawing Sheets

U.S. PATENT DOCUMENTS

| | | | |
|---|---|---|---|
| 4,301,956 A | 11/1981 | Hoerner | |
| 4,378,883 A | 4/1983 | Profeta | |
| 4,428,516 A | 1/1984 | Allen | |
| 4,452,385 A | 6/1984 | Prosen | |
| 4,513,897 A | 4/1985 | Graber | |
| 4,646,952 A | 3/1987 | Timmers | |
| 4,676,413 A | 6/1987 | Began et al. | |
| 4,709,840 A | 12/1987 | Allen | |
| 4,804,120 A | 2/1989 | Kraklio | |
| 4,815,638 A | 3/1989 | Hutyra | |
| 4,830,250 A | 5/1989 | Newbold et al. | |
| 4,856,686 A | 8/1989 | Workentine | |
| 4,863,080 A * | 9/1989 | Graber | 224/493 |
| 4,875,608 A | 10/1989 | Graber | |
| 4,976,386 A | 12/1990 | Geiger | |
| 5,067,641 A | 11/1991 | Johnson et al. | |
| 5,121,862 A | 6/1992 | Schmidt | |
| 5,129,559 A | 7/1992 | Holliday | |
| 5,181,822 A | 1/1993 | Allsop et al. | |
| 5,269,446 A | 12/1993 | Biehn | |
| 5,303,857 A | 4/1994 | Hewson | |
| 5,377,886 A | 1/1995 | Sickler | |
| 5,385,280 A * | 1/1995 | Littlepage et al. | 224/521 |
| 5,435,475 A | 7/1995 | Hudson et al. | |
| 5,495,970 A * | 3/1996 | Pedrini | 224/314 |
| 5,573,165 A * | 11/1996 | Bloemer et al. | 224/523 |
| 5,647,521 A | 7/1997 | Burgess | |
| 5,664,717 A | 9/1997 | Joder | |
| 5,690,260 A | 11/1997 | Aikins et al. | |
| 5,699,985 A | 12/1997 | Vogel | |
| 5,702,040 A | 12/1997 | Hedeen | |
| 5,735,410 A | 4/1998 | Kallstrom | |
| 5,862,966 A | 1/1999 | Mehls | |
| 5,871,131 A | 2/1999 | Low et al. | |
| 5,971,241 A | 10/1999 | Allen et al. | |
| 5,996,870 A | 12/1999 | Shaver | |
| 6,006,973 A | 12/1999 | Belinky et al. | |
| 6,007,053 A * | 12/1999 | Huang | 254/247 |
| 6,089,430 A | 7/2000 | Mehls | |
| 6,092,706 A | 7/2000 | Bogan | |
| 6,126,188 A | 10/2000 | Volodarsky | |
| 6,129,371 A | 10/2000 | Powell | |
| 6,199,735 B1 | 3/2001 | Cothern et al. | |
| 6,283,349 B1 | 9/2001 | Morris et al. | |
| 6,336,580 B1 | 1/2002 | Allen et al. | |
| 6,345,748 B1 | 2/2002 | Chimenti et al. | |
| 6,431,423 B1 | 8/2002 | Allen et al. | |
| 2001/0030216 A1 | 10/2001 | Johnson | |
| 2001/0035446 A1 | 11/2001 | Walstrom et al. | |
| 2002/0047031 A1 | 4/2002 | Ferman | |
| 2002/0096546 A1 | 7/2002 | Bogoslofski | |
| 2002/0117524 A1 | 8/2002 | Jeong | |

FOREIGN PATENT DOCUMENTS

| | | |
|---|---|---|
| DE | 4241008 | 2/1994 |
| DE | 4315292 | 11/1994 |
| DE | 4427450 | 3/1995 |
| DE | 4403715 | 8/1995 |
| DE | 4431426 | 3/1996 |
| DE | 4441853 | 5/1996 |
| DE | 4340009 | 6/1996 |
| DE | 4225110 | 4/1997 |
| DE | 19541331 | 11/1997 |
| DE | 19715527 | 11/1997 |
| DE | 19826077 | 12/1998 |
| DE | 19809092 | 2/1999 |
| DE | 19715969 | 6/1999 |
| DE | 19905332 | 3/2000 |
| DE | 19930004 | 1/2001 |
| DE | 19821608 | 6/2001 |
| EP | 0439155 | 1/1991 |
| EP | 1008491 | 6/2000 |
| EP | 1083093 | 3/2001 |
| FR | 2531021 | 2/1984 |
| FR | 2560835 | 9/1985 |
| FR | 2642024 | 7/1990 |
| FR | 2656577 | 7/1991 |
| FR | 2668435 | 4/1992 |
| FR | 2689468 | 10/1993 |
| FR | 2731189 | 9/1996 |
| FR | 2762561 | 10/1998 |
| GB | 2182619 | 5/1987 |
| GB | 2273273 | 6/1994 |
| WO | WO 91/05693 | 5/1991 |
| WO | WO 96/26085 | 8/1996 |
| WO | WO 99/64272 | 12/1999 |
| WO | WO 2004/014698 | 2/2004 |

* cited by examiner

VEHICLE-MOUNTED EQUIPMENT CARRIER

BACKGROUND OF THE INVENTION

The present invention relates to equipment carriers, such as carriers for bicycles, skis, luggage or the like, which are to be mounted onto a vehicle trunk lid or door.

Carriers of this type are encountering increasing favour among users with respect to carriers which are to be mounted on the vehicle roof, also due to the inconvenience of placing the equipment (e.g. a bicycle) on the vehicle roof, particularly with relatively tall vehicles such as Sport Utility Vehicles (SUV), vans or others.

It is particularly important for an equipment carrier of the type to be mounted on a trunk lid or door that it can be mounted and removed with very quick and simple operations by the user. Equipment carriers of this type which have been proposed heretofore are not able to solve this problem very satisfactorily. A conventional equipment carrier for mounting on a vehicle trunk lid or door comprises a frame with a structure for carrying one or more items of equipment and provided with engagement means for engaging the rear trunk lid or door of the vehicle. In order to safely secure the carrier to the vehicle, a number of straps or belts are provided which are used to connect the frame of the carrier to the vehicle structure. The operation of arranging these straps is relatively complicated and time-consuming, and the same is true when the carrier must be removed from the vehicle. Moreover, the addition of these straps gives rise to a not very attractive appearance of the carrier once it has been mounted on the vehicle.

SUMMARY OF THE INVENTION

It is an object of the present invention to provide an equipment carrier for mounting on a vehicle trunk lid or door which can be mounted on the vehicle and removed from the vehicle with extremely simple and quick operations.

It is also an object of the present invention to provide an equipment carrier of this type which does not imply the use of separate belts or straps in order to secure the carrier on the vehicle structure.

It is also an object of the present invention to provide an equipment carrier for mounting on a vehicle trunk lid or door which ensures the carrier to be safely secured to the vehicle structure.

Another object of the invention is that of providing an equipment carrier for mounting on a vehicle trunk lid or door which is suitable for carrying a variety of different items of equipment.

According to the invention, these and other objects are achieved by providing an equipment carrier having the features specified in any of the attached independent claims. Further preferred features are indicated in the dependent claims.

The invention is particularly directed to an equipment carrier for mounting onto a rear component of a vehicle structure, such as a vehicle trunk lid or door, comprising:

a frame having lower engagement means engageable with a lower area of the vehicle component;

a structure connected to the frame or forming part thereof, for carrying one or more items of equipment;

at least one vehicle engaging member connected to the frame or forming part thereof, for engaging the vehicle component at a position above said lower area, a strap member having upper engagement means for engagement with an upper area of the vehicle component, at least one support connected to the frame or forming part thereof, and having strap tensioning means, preferably in form of ratchet-type means, which are engaged by said strap member and can be controlled for tensioning the strap member in order to tighten said upper and lower engagement means onto said upper and lower areas of the vehicle component.

In a preferred embodiment, the above mentioned vehicle engaging member for engaging the vehicle component is connected to, or forms part of, the support having the ratchet-type means for tensioning the strap member.

In the carrier of the invention, one or more strap members may be provided engaged with respective ratchet-type means, so that the strap members appear to constitute an integral part of the whole carrier.

In order to mount the carrier on the vehicle, the frame of the carrier is simply placed with its lower engagement means engaged for instance on the lower edge of the rear trunk lid or door of the vehicle. One or more vehicle engaging members carried by the frame rest on the trunk lid or door and each strap member is arranged with its upper engagement means on the upper edge of the trunk lid or door. Then, each strap member can be tightened easily and quickly by the above mentioned ratchet-type tensioning means, so that the lower engagement means of the carrier frame are pressed into engagement against the lower area of the trunk lid or door, while the upper engagement means of the strap members are urged into engagement with the upper edge of the lid or door.

In a further preferred embodiment, each support carrying the strap tensioning means is provided with strap winding means for storing the strap member in a wound condition within the respective support. Thus, the carrier and the strap members integrated therein assume a particularly compact configuration when the carrier is not in use, whereas the strap members can be easily unrolled from the respective supports when the carrier must be mounted.

According to a further preferred feature, the above mentioned vehicle engaging member for engaging the vehicle component is in form of a rocking member pivotally mounted with respect to the frame around a pivot axis and having two end engaging feet for engaging the vehicle component, which preferably are also swingable relative to the rocking member. In the mounted condition of the carrier, the lower engagement means of the frame are engaged with the lower area of the trunk lid or door, the two end engaging feet of the above mentioned rocking member are engaged with the lid or door and the upper engagement means of the strap members are engaged on the upper area of the trunk lid or door. Due to the above described arrangement, when the strap members are put under tension, the frame of carrier is subjected to a tilting torque around the above identified pivot axis with respect to the above mentioned rocking member, which is then firmly urged in a fixed position against the surface of the vehicle trunk lid or door. Thus, even when the tensioned strap members have a substantially horizontal orientation, such as on sedan cars having a trunk lid with a substantially horizontal surface, the lower engagement means are in any case safely urged strongly into engagement on the lower area of the vehicle trunk lid or door. This constitutes a further important advantage of the carrier according to the invention.

BRIEF DESCRIPTION OF THE DRAWING

Further features and advantages of the invention will become apparent from the following description with reference to the annexed drawings, given purely by way of non limiting example, in which:

FIG. 16 is a cross-sectional view at an enlarged scale taken along line XVIII-XVIII of FIG. 23.

DESCRIPTION OF PREFERRED EMBODIMENTS OF THE INVENTION

Figure 1:
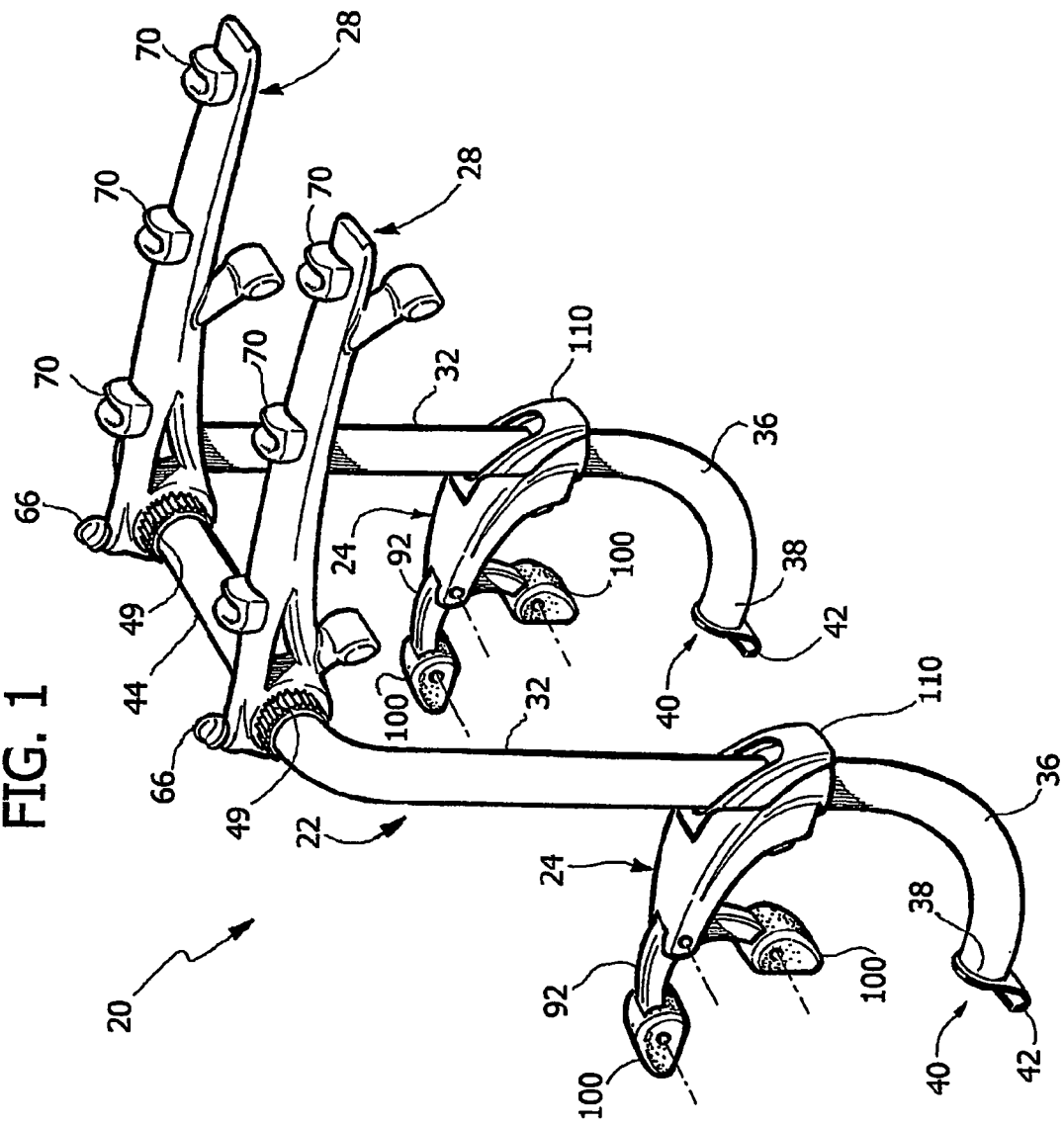
FIG. 1 is a perspective view of a first embodiment of the invention, in a configuration adapted to be used as a bicycle carrier, where the strap members have been eliminated for better clarity of illustration.
Figure 2:
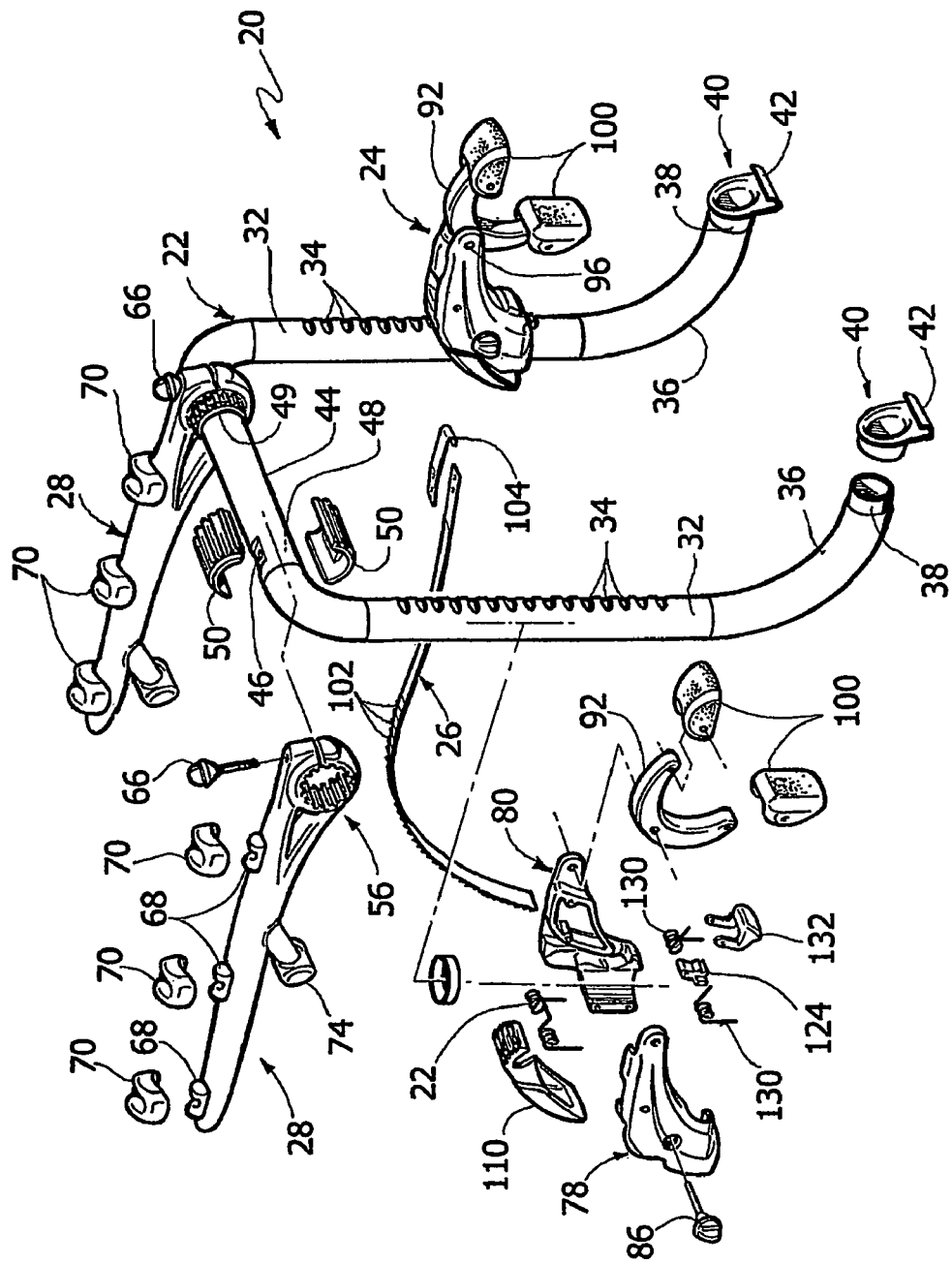
FIG. 2 is a further perspective and partially exploded view of the carrier of FIG. 1.
Figure 3:
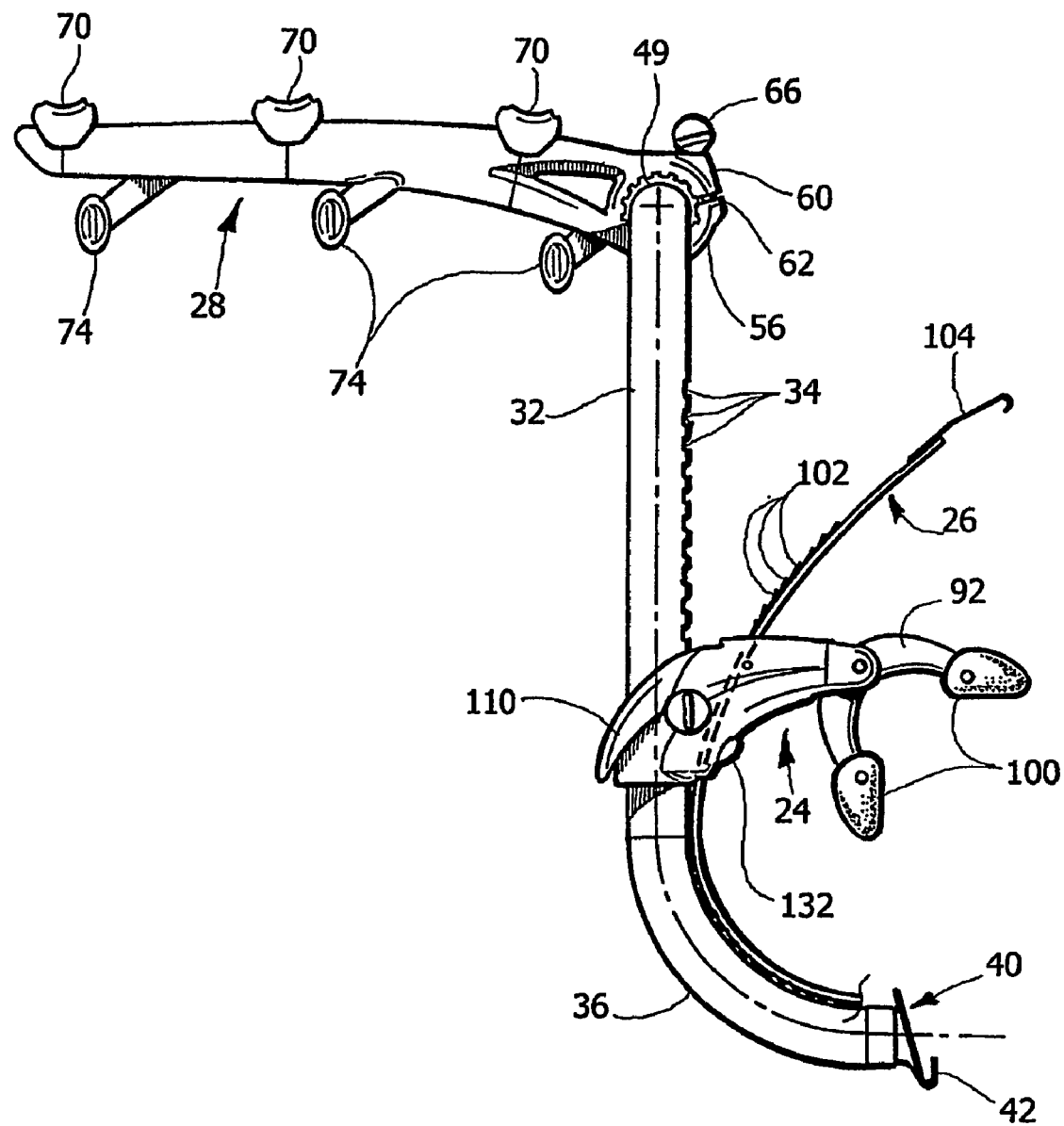
FIG. 3 is a side view of the carrier of FIGS. 1, 2.
Figure 4:
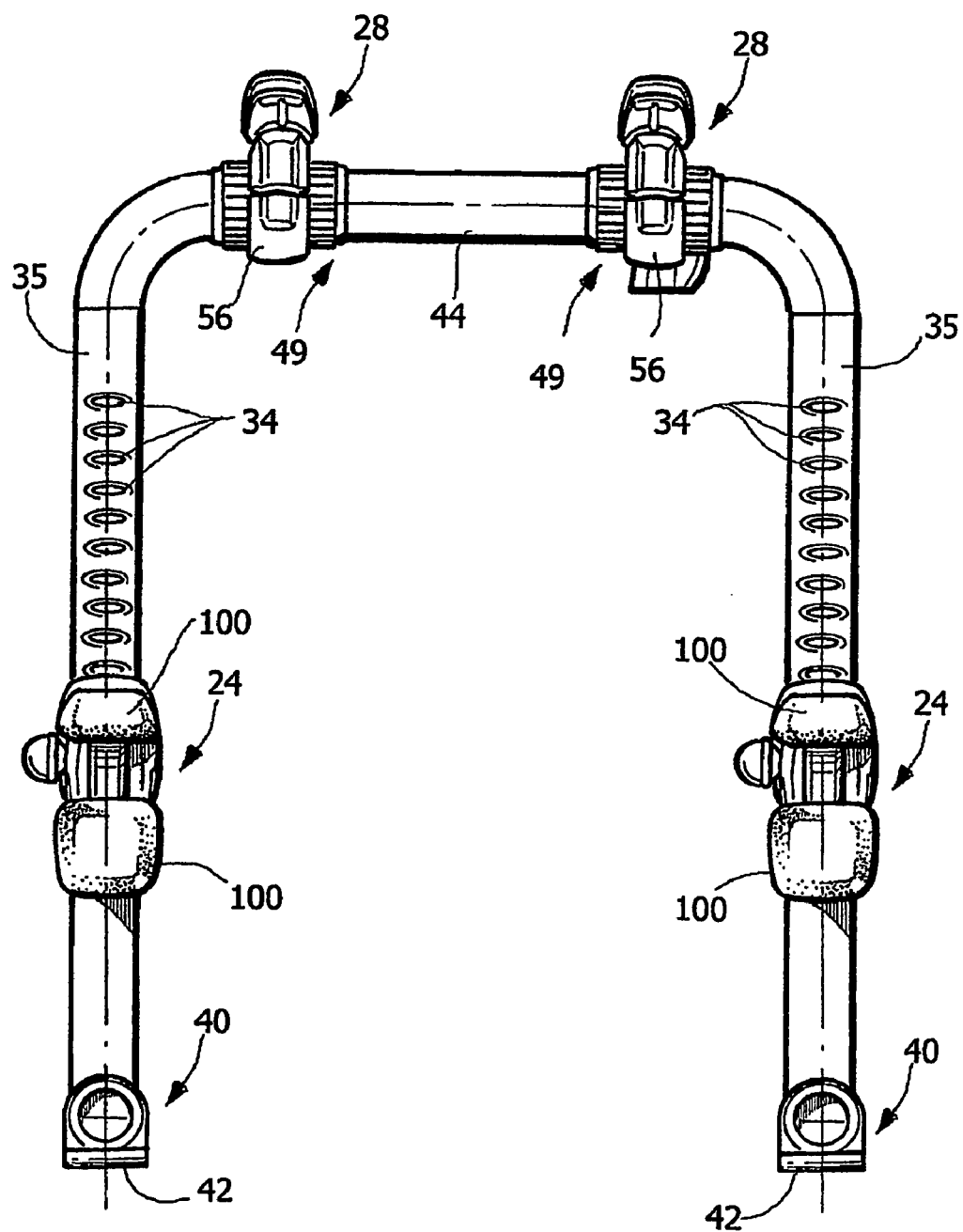
FIG. 4 is a front view of the carrier of FIGS. 1-3.
Figure 5:
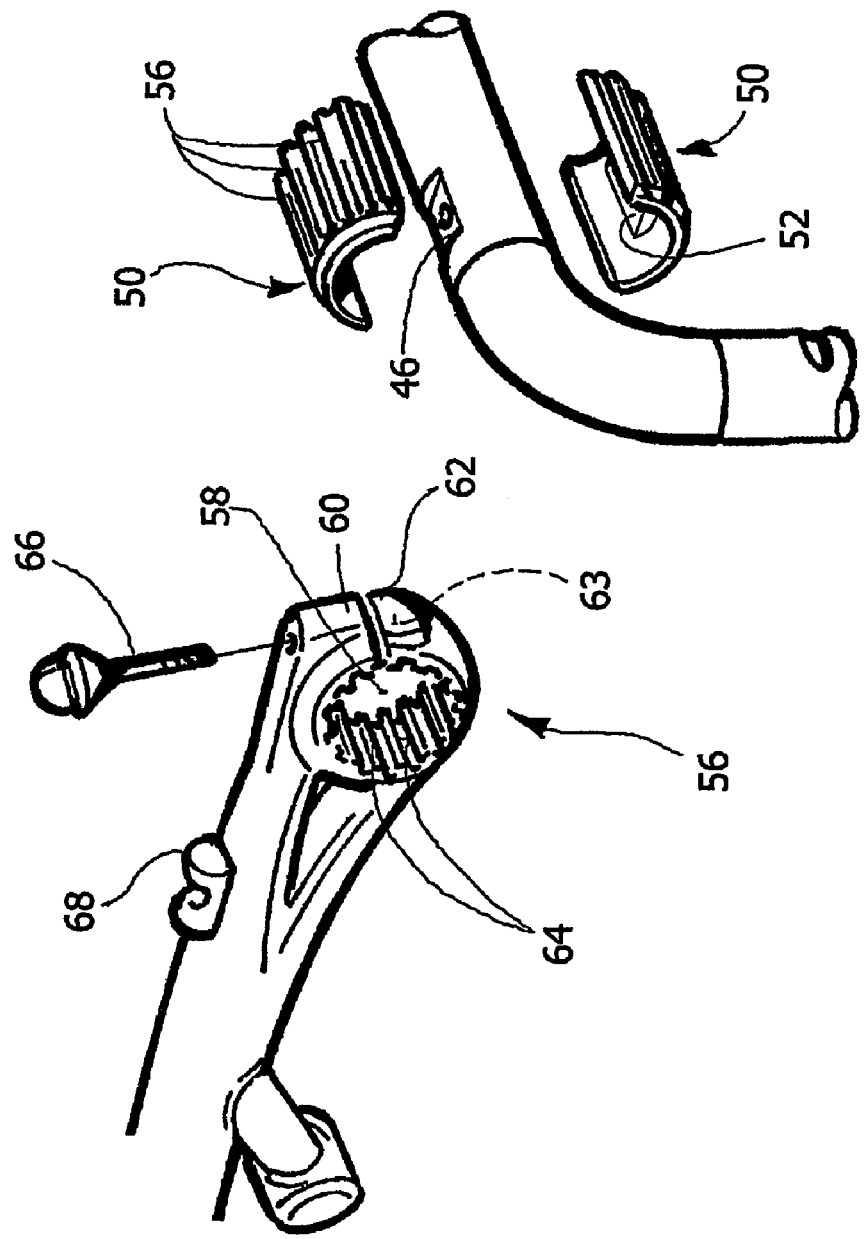
FIG. 5 is a view at an enlarged scale of a detail of FIG. 2.
Figure 6:
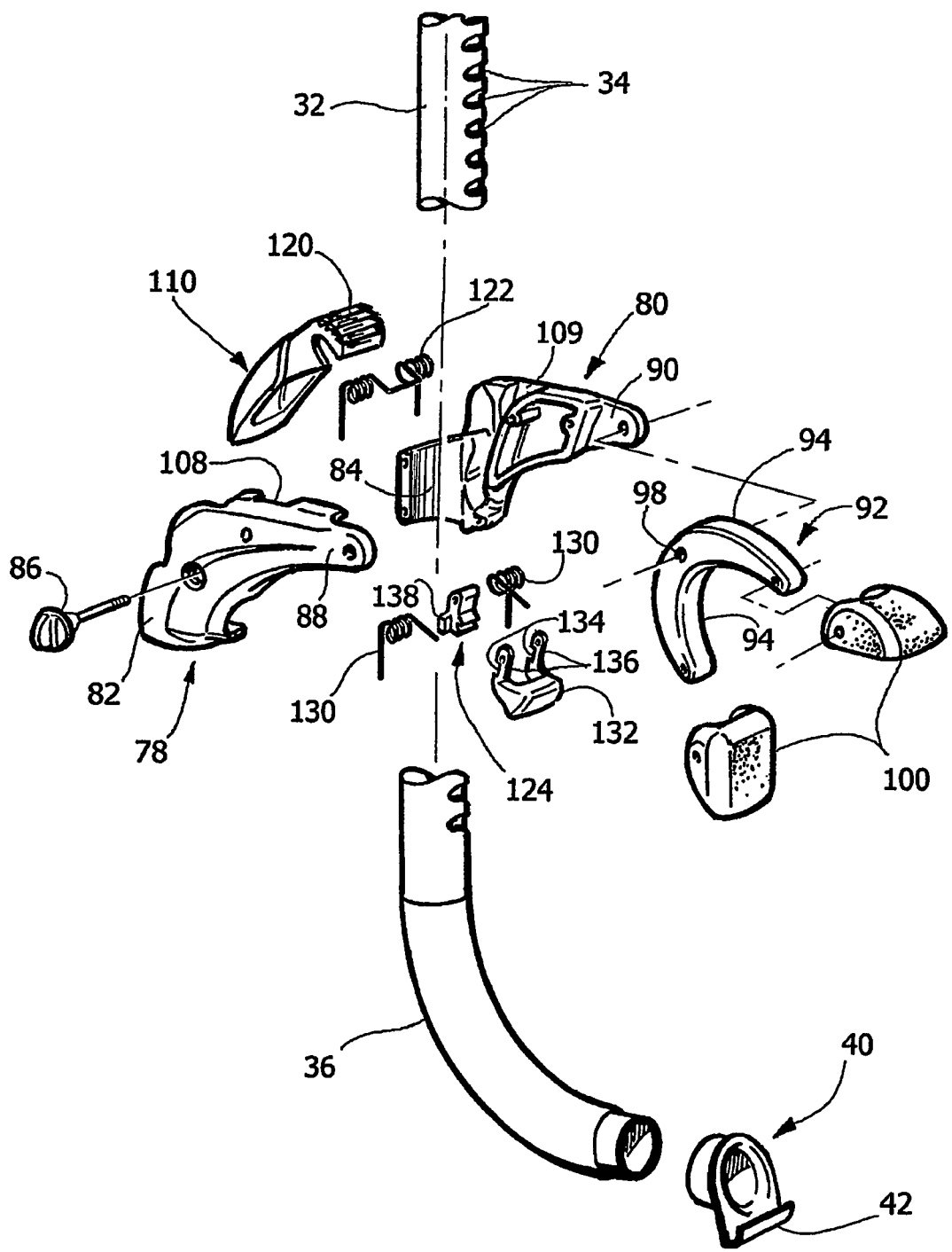
FIG. 6 is a view at an enlarged scale of a further detail of FIG. 2.

With reference to FIGS. 1-9, a first embodiment of the invention is shown therein, in form of an equipment carrier 20 adapted for mounting to a vehicle for supporting various items on the exterior of the vehicle. Equipment carrier 20 generally includes a frame 22, a pair of supports 24 each of which includes a strap 26 (see in particular FIGS. 2,3,7), and a load-carrying arrangement engaged with frame 22, e.g. a pair of support arms 28.

In the illustrated embodiment, frame 22 includes a pair of upright sections 32 having forwardly facing spaced indentations 34. A curved lower section 36 extends from the lower end of each upright section 32, and terminates in a forwardly facing end 38. An engagement member 40, which includes a hook 42 at its lower end, is engaged with the forwardly facing end 38 of each lower section 36.

A cross-member 44 extends between and interconnects the upper ends of upright sections 32. Cross-member 44 includes provisions for mounting the equipment-carrying component(s) of carrier 20. In one embodiment, cross-member 44 includes indentations 46, 48 (see FIGS. 2,5). An engagement member 49 includes a pair of shell sections 50 which are engaged with cross-member 44 at each set of indentations 46, 48, and which fit together to encircle cross-member 44. Each shell section 50 includes a mounting boss 52 (see FIG. 5) which is received within one of indentations 46, 48 so as to locate shell sections 50 on cross-member 44 and to prevent rotation of shell sections 50. Transverse, radially spaced ridges 56 are formed on each shell section 50.

Each support arm 28 includes a hub section 56 having a transverse passage 58. (see FIGS. 2,5). Hub section 56 has a split end construction, and includes a barrel 60 on one end and a receiver 62 on the other. A nut is engaged within receiver 62. A series of radially spaced inwardly extending transverse teeth 64 are formed about the periphery of passage 58. Teeth 64 are adapted to engage ridges 54 of shell sections 50, such that arm 28 can be engaged with cross-member 44 in varying angular orientations. Hub section 56 is slid axially onto engagement member 49 in a desired axial orientation. A screw 66 is inserted through barrel 60 and into engagement with nut 63 located within receiver 62, and is tightened so as to clamp hub section 56 onto engagement member 49 and to retain arm 28 in position on engagement member 49.

In the illustrated embodiment, support arms 28 include structure for supporting equipment such as a number of bicycles in a suspension-type manner, in the form of saddles 68 having pads 70 engaged therewith. A retainer strap (not shown) is engaged with each saddle 68 and is adapted to encircle a component of an item of equipment, e.g. a bar or tube of a bicycle frame, to engage the item of equipment with support arm 28 in a known manner. Arms 28 include stabilizing members 74 for preventing the bicycles from swinging when suspended by engagement with saddles 68.

Each support 24 is formed by a pair of support sections 78, 80 (FIGS. 2,6) which fit together in a clamshell-type manner. Support sections 78, 80 include respective channels 82, 84, which encircle frame upright section 32 and define a passage in close tolerance to the outer surface of upright section 32. With this construction, each support 24 is axially movable on its respective upright section 32.

Support sections 78, 80 include aligned transverse passages adapted to receive the shank of a screw 86, which has a configuration similar to that of screw 66. The aligned transverse passages in support sections 78, 80 are adapted to be positioned in alignment with one of indentations 34, and screw 86 is engaged with the passages in support sections 78, 80 so as to selectively fix support 24 in a desired position on upright section 32. The position of support 24 can be adjusted by removing screw 86, repositioning support 24 and replacing screw 86 such that screw 86 engages a different one of indentations 34. A threaded receiver is engaged in the passage in one of the support sections, e.g. section 80, for receiving the threads of screw 86. The central area of the shank of screw 86 may be formed without threads to facilitate engagement with the selected one of indentations 34.

The forward ends of support sections 78, 80 include respective mounting ears 88, 90, which define a space therebetween within which a U-shaped engagement member 92 having a pair of arms 94 is received. A pivot pin 96 (FIGS. 2,7,8) extends through a passage 98 in engagement member 92 and through aligned openings in ears 88, 90, for pivotably mounting engagement member 92 within the space between ears 88, 90. A foot 100 is pivotably mounted at the end of each engagement arm 94, and preferably includes a soft surface.

Figure 7:
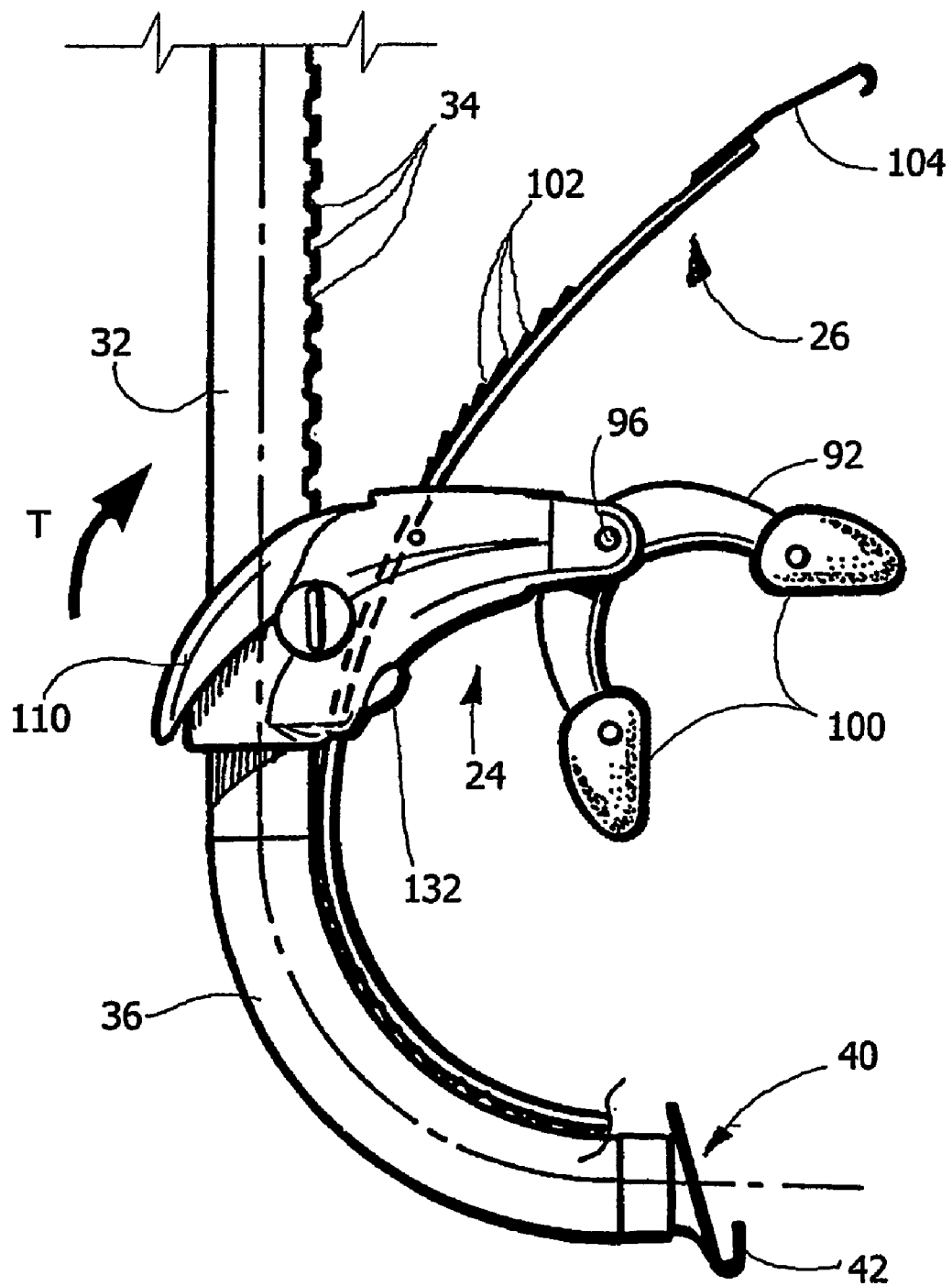
FIG. 7 is a detail at an enlarged scale of FIG. 3.
Figure 8:
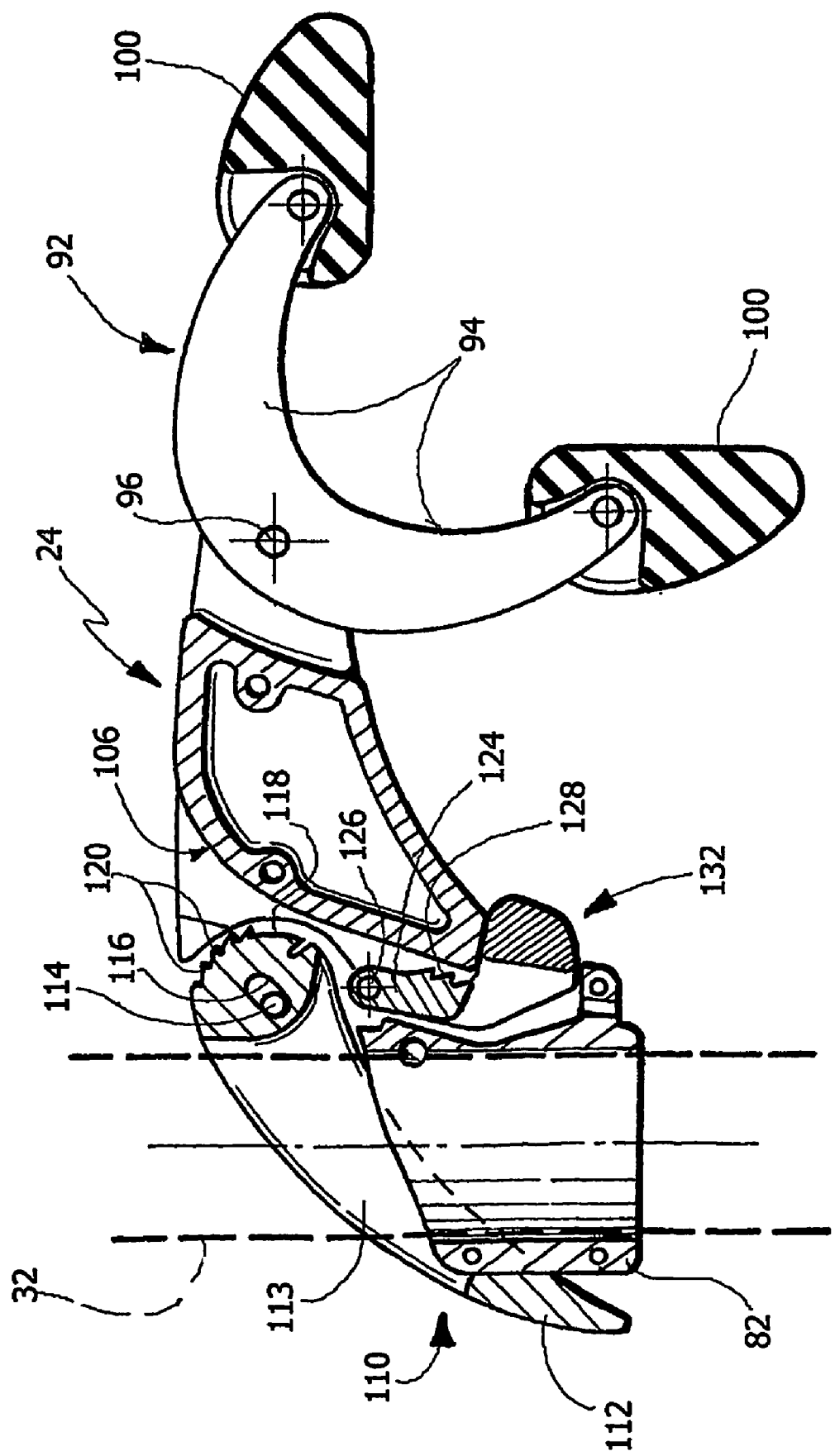
FIG. 8 is a cross-sectional view of the detail of FIG. 7.
Figure 9:
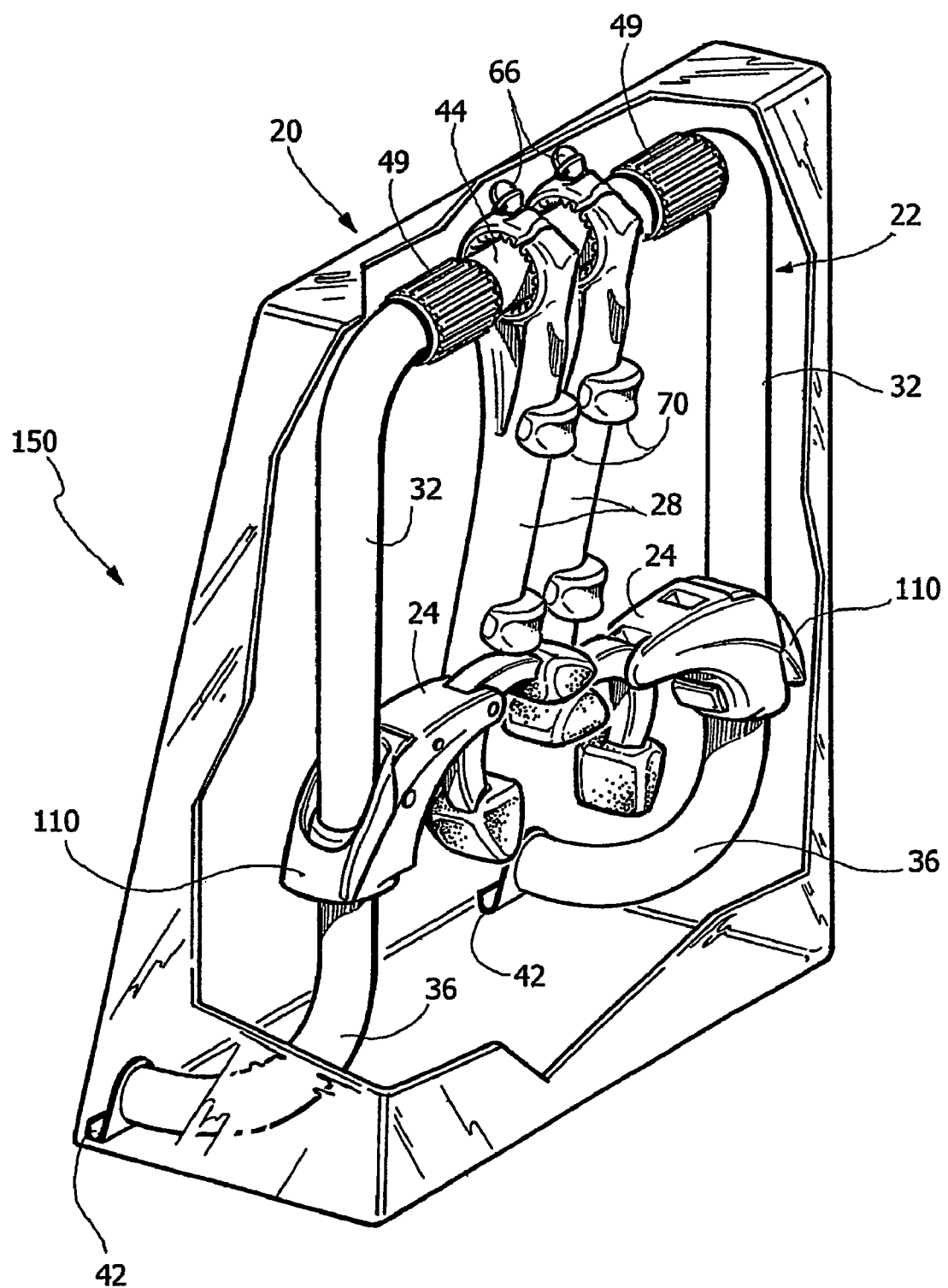
FIG. 9 is a perspective view showing the first embodiment in a folded condition within a case.

Each strap 26 extends through a passage defined by one of supports 24 (see FIGS. 7,8). Each strap 26 has a composite construction, including an inner core formed of a material that is non-stretchable under normal conditions, e.g. a metallic or composite material. The core of strap 26 is over-molded with a hard plastic material which is formed to have a series of one-way teeth 102. Strap 26 includes a hook 104 at its upper end.

The surface of strap 26 opposite teeth 102 is generally smooth, and contacts a curved strap engagement surface 106 defined by support 24 (see FIG. 8). Strap engagement surface 106 is located between a pair of side walls 108, 109 (FIG. 6) defined by support sections 78, 80, respectively.

Each support 24 includes a tensioning lever 110 having a handle portion 112 with an elongated opening 113 through which frame upright section 32 extends (FIG. 8). Tensioning lever 110 is pivotally mounted to support 24 via a pivot pin 114 that extends through a passage 116 formed in the forward end of tensioning lever 110 opposite handle portion 112. Opening 113 is shaped so as to receive frame upright section 32 when tensioning lever 112 is raised and lowered. Tensioning lever 110 includes a cam-shaped forward surface 118 having a series of teeth 120 that face teeth 102 of strap 26. A torsion spring 122 is engaged with tensioning lever 110, for biasing tensioning lever 110 toward a lowered inoperative position in which teeth 120 are disengaged from strap teeth 102.

With reference to FIG. 8, a strap retainer 124 is pivotally mounted below the forward end of tensioning lever 110 via a pivot pin 126. Strap retainer 124 includes a series of teeth 128 which face the lower end of strap engagement surface 106. A pair of torsion springs 130 (FIG. 6) engage strap retainer 124 so as to urge teeth 128 toward strap engagement surface 106. Pivot pin 126 also functions to mount a release trigger 132 by engagement within aligned openings defined by a pair of arms 134. Each arm 134 includes a recess 136, and strap retainer 124 has outwardly extending tabs 138 that are received within recesses 136. With this arrangement, trigger 132 can be depressed so as to move teeth 128 out of engagement with strap teeth 102 against the force of torsion springs 130. When trigger 132 is released, torsion springs 130 function to move strap retainer 124 toward strap engagement surface 106 to a position in which strap retainer teeth 128 engage strap teeth 102, and to move trigger 132 outwardly by engagement of tabs 138 with trigger arms 134.

Figure 10:
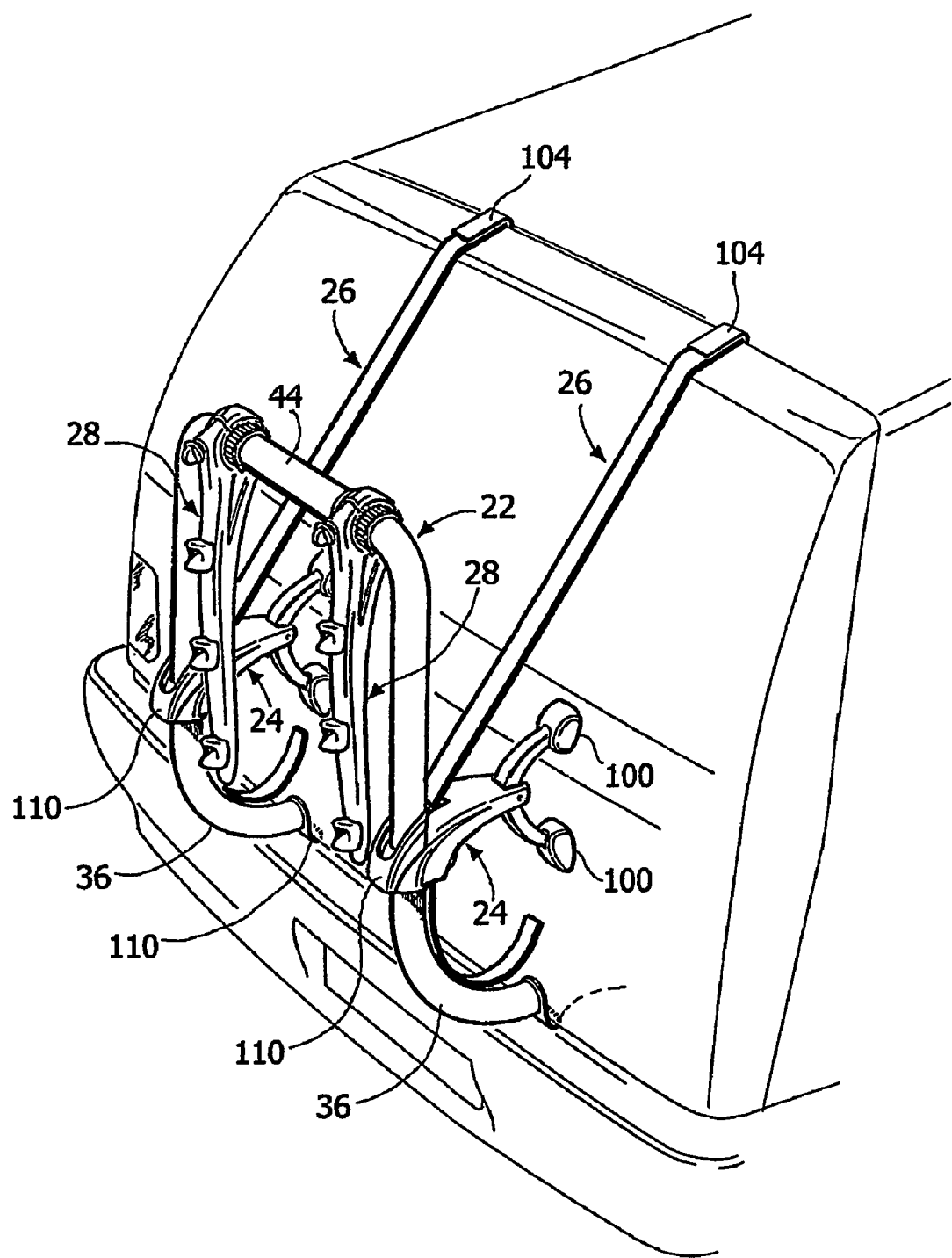
FIG. 10 is a perspective view showing the first embodiment of the carrier of the invention mounted on a station-wagon.
Figure 11:
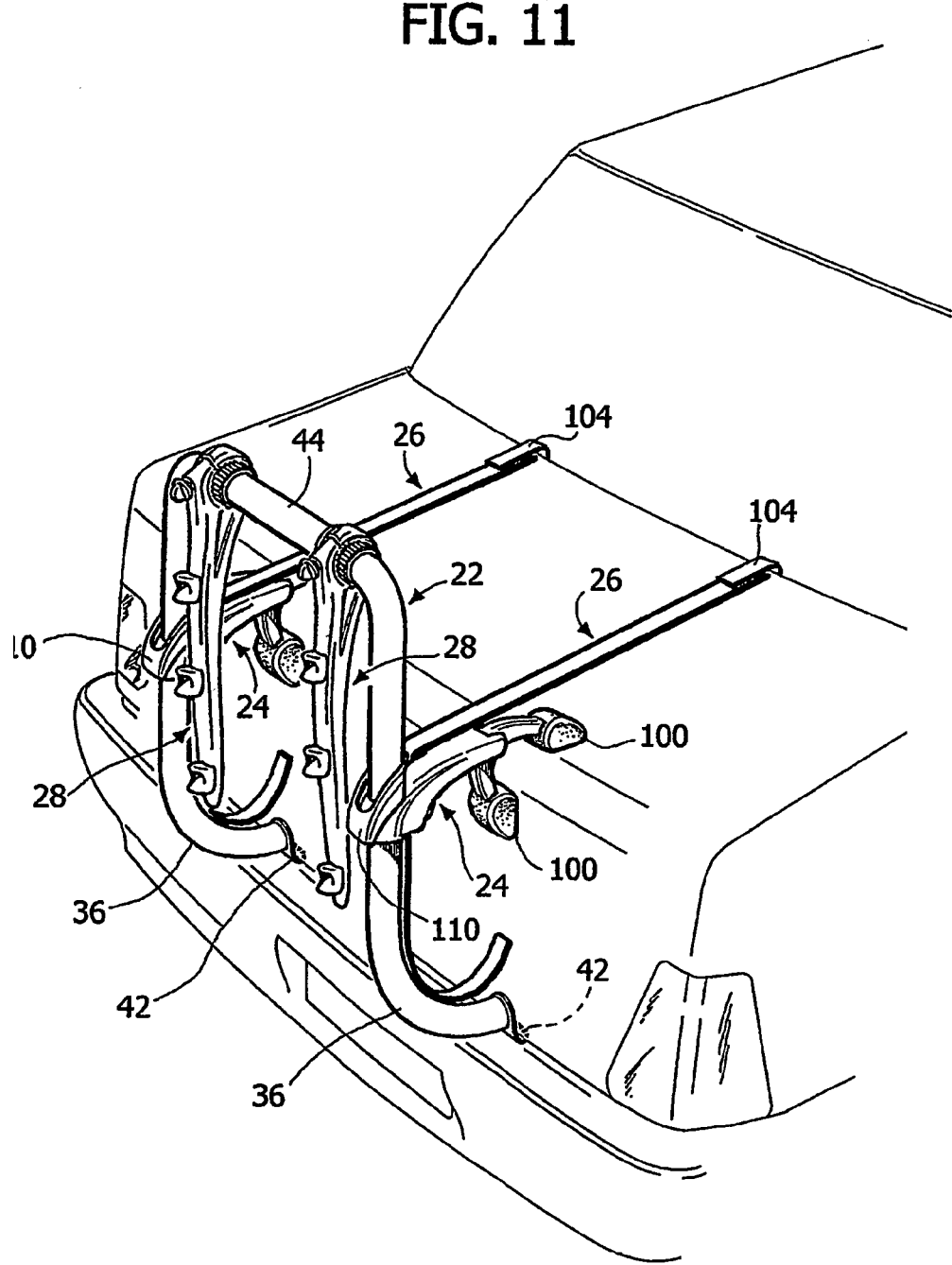
FIG. 11 is a perspective view showing the first embodiment mounted on a sedan car.

In operation, equipment carrier 20 is engaged with the trunk or rear door of a vehicle as follows. Initially, trigger 132 is depressed so as to disengage strap retainer teeth 128 from strap teeth 102, and each strap 26 is extended or moved outwardly relative to its respective support 24 to an extended position. Lower hook 42 of frame 22 is engaged with the lower edge of the vehicle trunk lid or rear door, and strap hook 104 is engaged with the upper or forward edge of the vehicle trunk lid or rear door (FIGS. 10,11). Supports 24 are positioned on upright members 32 at an appropriate elevation for the trunk lid or rear door to which equipment carrier 20 is mounted, and engagement member 92 is pivoted so as to bring feet 100 into engagement with the underlying surfaces of the vehicle trunk lid or rear door. Engagement member 92 can be positioned so that feet 100 are in vertical alignment with each other (FIG. 10) or such that the upper foot 100 overlies the top surface of the trunk lid and the lower foot 100 engages the rearwardly facing surface of the trunk lid (FIG. 11). The user then engages screws 86 with supports 24 to maintain supports 24 in the desired vertical position on frame upright section 34. Thereafter, the user operates tensioning lever 110 by repeatedly raising and lowering tensioning lever 110. Each time tensioning lever 110 is lifted, teeth 120 of tensioning lever 110 engage strap teeth 102 so as to retract strap 26 until strap hook 104 and lower hook 42 engage the upper and lower edges, respectively, of the trunk or rear door. The user continues to retract strap 26 in this manner so as to induce tension in strap 26 sufficient to maintain strap hook 104 and lower hook 42 in engagement with the upper and lower edges, respectively, of the trunk or rear door. Upon each advancement of strap 26, strap retainer 124 is pivoted away from strap 26 by the passage of strap teeth 102 over strap retainer teeth 128. When tensioning lever 112 is lowered, strap retainer teeth 128 engage strap teeth 102 to prevent strap 26 from being extended, such that tensioning lever 110 and strap retainer 124 function to provide a ratchet-type tensioning mechanism for applying tension to strap 26. In this manner, engagement of hooks 104, 42 with the upper and lower edges, respectively, of the trunk lid or rear door, in combination with engagement of feet 100 therebetween with the surfaces of the trunk lid or rear door, function to securely engage equipment carrier 20 with the trunk lid or rear door.

It is to be noted that the carrier of the invention is able to solve a problem which is encountered when mounting an equipment carrier on a trunk lid as in FIG. 11, having a substantially horizontal upper surface. In this case, the hooks 104, when engaged on the forward edge of the trunk lid, are substantially at the same level, in the vertical direction, as supports 24. As a consequence of this, the tensioned portions of straps 26 are substantially horizontal or only slightly inclined relative to the horizontal. In the absence of the specific structure and arrangement of engagement members 92 as described above, tensioning straps 26 would not cause the lower hooks 42 to be urged upwardly against the lower edge of the trunk lid, so that a safe connection of the carrier to the vehicle would not be achieved. In the invention however, when the straps 26 are tensioned, supports 24 are subjected to a tilting torque around pins 96 (in the direction of arrow T in FIG. 7) relative to the engagement members 92, which are urged with their pads 100 against the rear and upper surfaces of the trunk lid. As a result of this tilting torque, the lower hooks 42 are safely urged upwardly against the lower edge of the lid.

To remove equipment carrier 20, the user depresses release trigger 132 to disengage each strap retainer 124 from its respective strap 26, which enables straps 26 to be extended and to thereby disengage hooks 104, 42 from the upper and lower edges, respectively, of the trunk lid or rear door.

When equipment carrier 20 is engaged with the vehicle trunk lid or rear door, bicycles or other equipment can be engaged with support arms 28 in a conventional manner using saddles 68 and retainer straps 72. Stabilizers 74 prevent the outer bicycles from swinging, and frame 22 prevents the inner bicycle from swinging.

When equipment carrier 20 is not in use, the user disengages support arms 28 from engagement members 49 and moves support arms 28 inwardly (see FIG. 9), which allows support arms 28 to be pivoted about cross-member 44 and to hang down between upright sections 32 of frame 22. If desired, support arms 28 can be moved outwardly into engagement with engagement members 49 when positioned in this manner, to maintain support arms 28 in position. In addition, screws 86 can be disengaged from the respective indentation 34 in upright section 32, to allow supports 24 to be pivoted toward each other within the space between upright sections 32. This folding capability of supports 24 and arms 28 allows carrier 20 to assume a compact configuration when not in use, in which it can be stored in a case 150, and to quickly and easily be returned to its normal configuration for use.

Straps 26 are manufactured with a length sufficient to enable carrier 20 to be used with any type of vehicle, from one having a small trunk lid, e.g. a small sedan or coupe, to one having a large rear door, e.g. a van or SUV.

Frame 22 is configured to have a height sufficient to enable the vehicle license plate to be visible when equipment carrier 20 is mounted to the vehicle. This typically means that, in European countries, frame 22 has a greater height than is necessary for domestic vehicles, since European vehicles typically have license plates mounted higher than do domestic vehicles.

It should be understood that equipment carrier 20 may be modified to carry other types of equipment, or to carry similar types of equipment in different ways. For example, frame 22 can be mounted to a vehicle using supports 24 and straps 26, and may include lower support structure for supporting bicycles from below rather than suspending the bicycles from above, i.e. in a tray-type configuration having either a fork-type mount or a wheel mount. It should also be understood that, while a ratchet-type engagement system is shown for tensioning straps 26, any other type of variable position engagement and tensioning system may be employed in place of the ratchet-type system.

Figure 12:
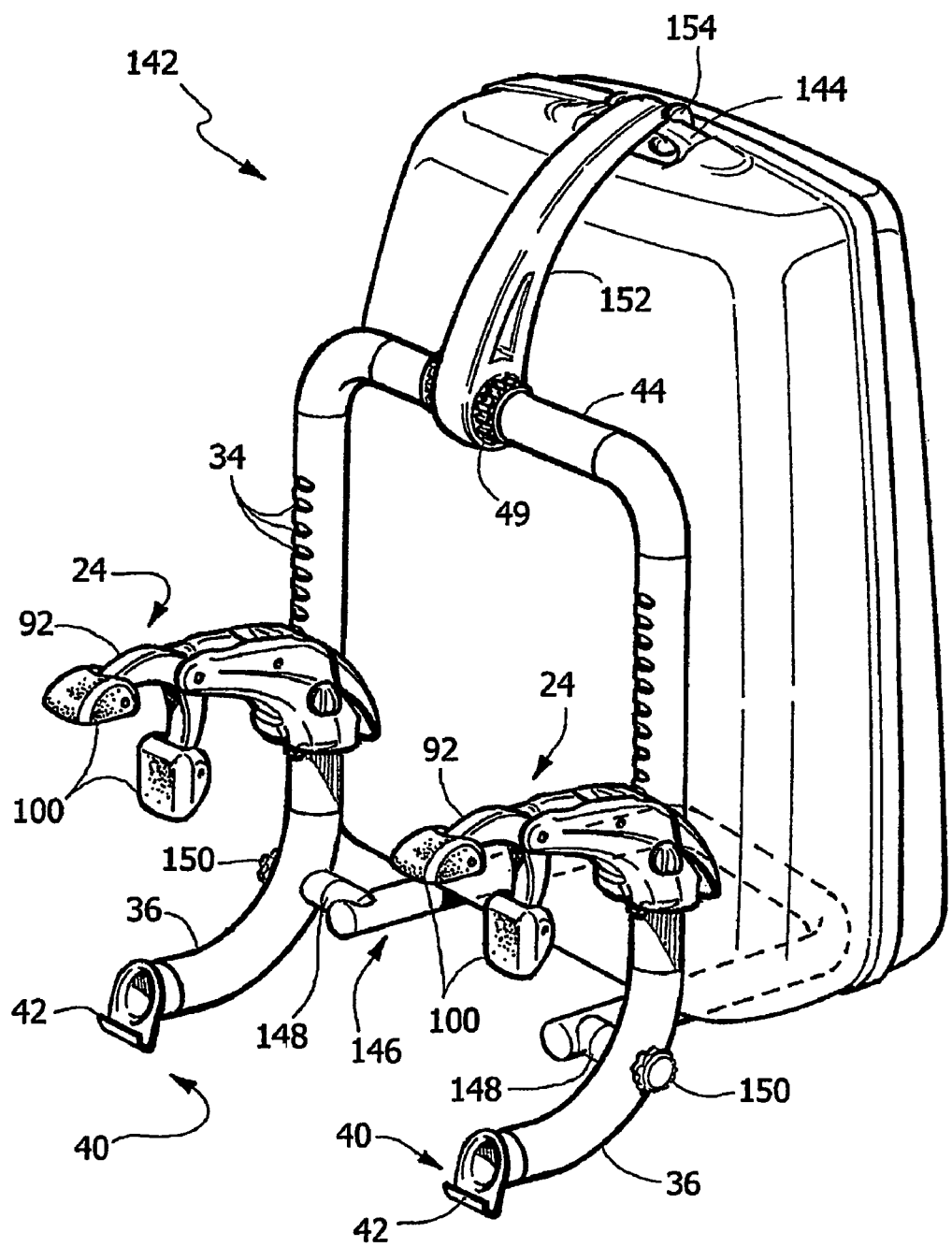
FIG. 12 is a perspective view of the first embodiment of the carrier of the invention in a version for transporting a piece of luggage, where the strap members have been eliminated for better clarity of illustration.

Examples of other types of equipment that can supported by carrier 20 include an equipment box 142 (FIG. 12) which may have a handle 144. In this embodiment, a lower support frame 146 extends rearwardly from lower frame sections 36 and is secured thereto via mounting members 148 and a threaded rod engaged with a knob 150. A single arm 152 extends from upper cross-member 44 of frame 22. A latch 154 is mounted to the end of arm 152, and is engageable with handle 144 of equipment box 142.

Figure 13:
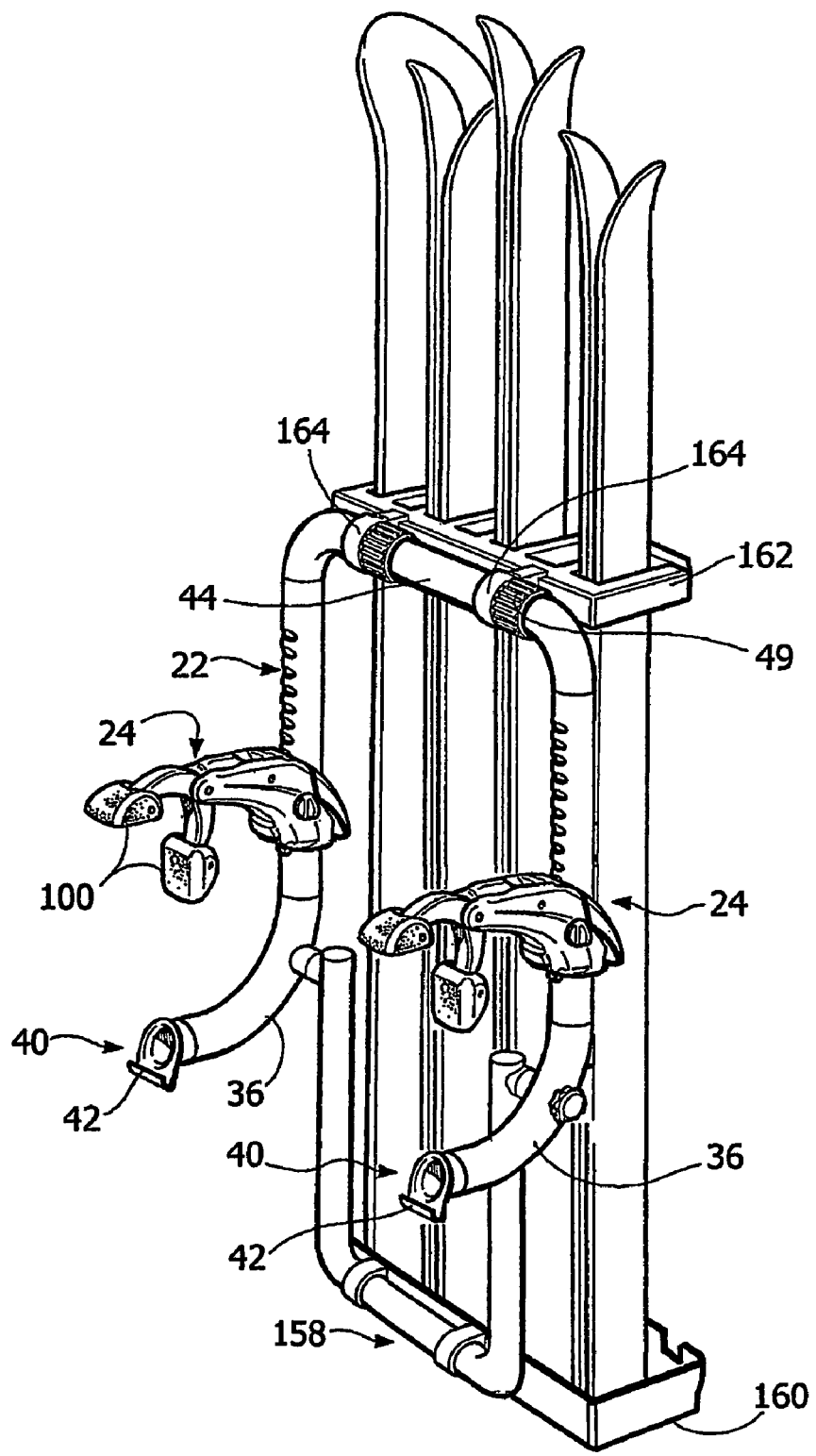
FIG. 13 is a perspective view of the first embodiment in a version adapted for transporting skis and/or snowboards, where also the strap members have been eliminated.

In a ski or snowboard carrier version (FIG. 13), a lower frame 158 extends downwardly from lower frame sections 36 of frame 22. A tray 160 is engaged with lower frame 158, and has compartments configured to receive the lower ends of skis or snowboards. An upper ski/snowboard support 162 is engaged with upper cross-member 44 of frame 22 via a pair of collars 164 having inwardly facing teeth that engage the ridges of engagement members 49. Support 162 includes spaced apart arms between which skis or snowboards are received. Flexible and resilient straps are engaged with the arms and the skis or snowboards so as to maintain the skis or snowboards in position between the arms.

In another version (FIG. 14), a pair of ski/snowboard supports 168 may be engaged with upright sections 32. Each ski/snowboard support 168 includes spaced apart recesses which are adapted to receive spaced apart areas of skis or snowboards. The ski or snowboard bindings rest on the lower one of ski/snowboard supports 168, and flexible and resilient straps engage the rearward edges of the skis or snowboards to maintain the skis or snowboards in engagement with ski/snowboard supports 168.

It is understood that various other types of equipment carrying structures may be engaged with the frame so as to carry equipment exteriorly of a vehicle. It is also understood that frame 22 may assume various other configurations and is not limited to the specific type of configuration as shown and described. Frame 22 may have any configuration which provides lateral stability against twisting when engaged with the top and bottom areas of a vehicle trunk lid or door, and which provides intermediate support between the top and bottom engagement of the frame therewith.

With reference to FIGS. 15-26 a second embodiment of the invention is shown therein. In these figures, parts corresponding to those of FIGS. 1-14 are designated by the same reference numerals.

Figure 17:
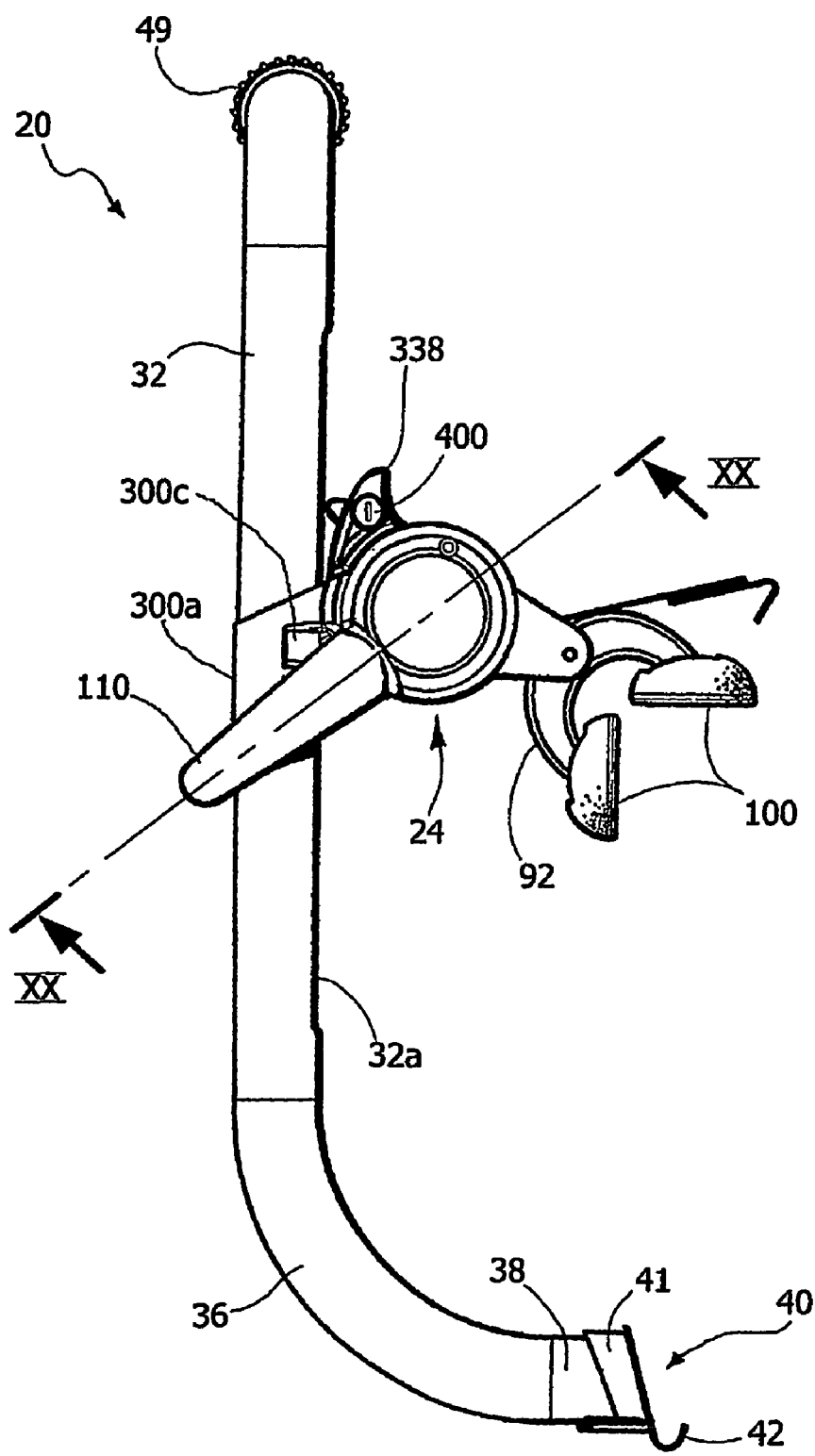
FIG. 17 is a side view of the second embodiment, where the ski support members and the bicycle support arms have been eliminated.
Figure 18:
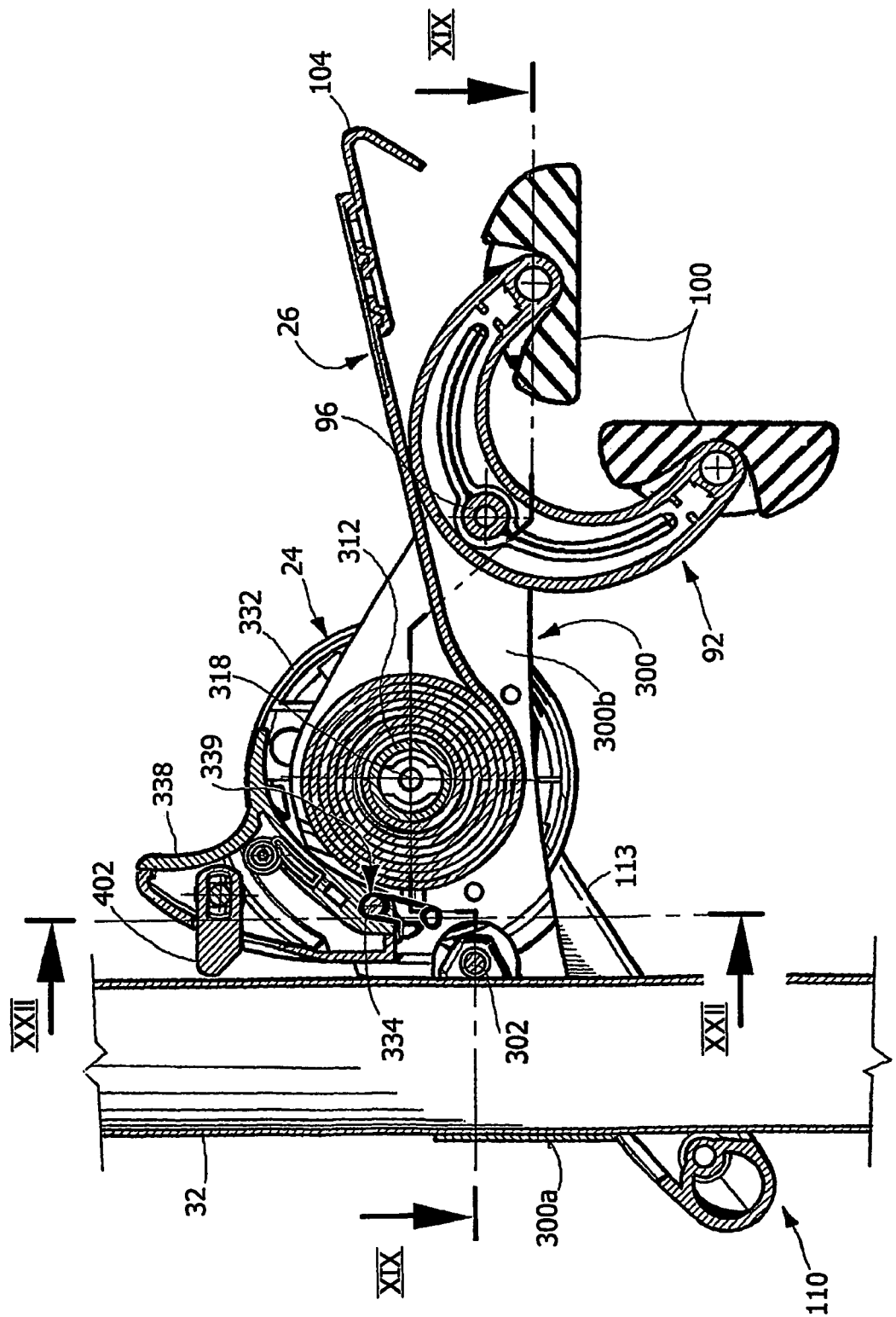
Figure 19:
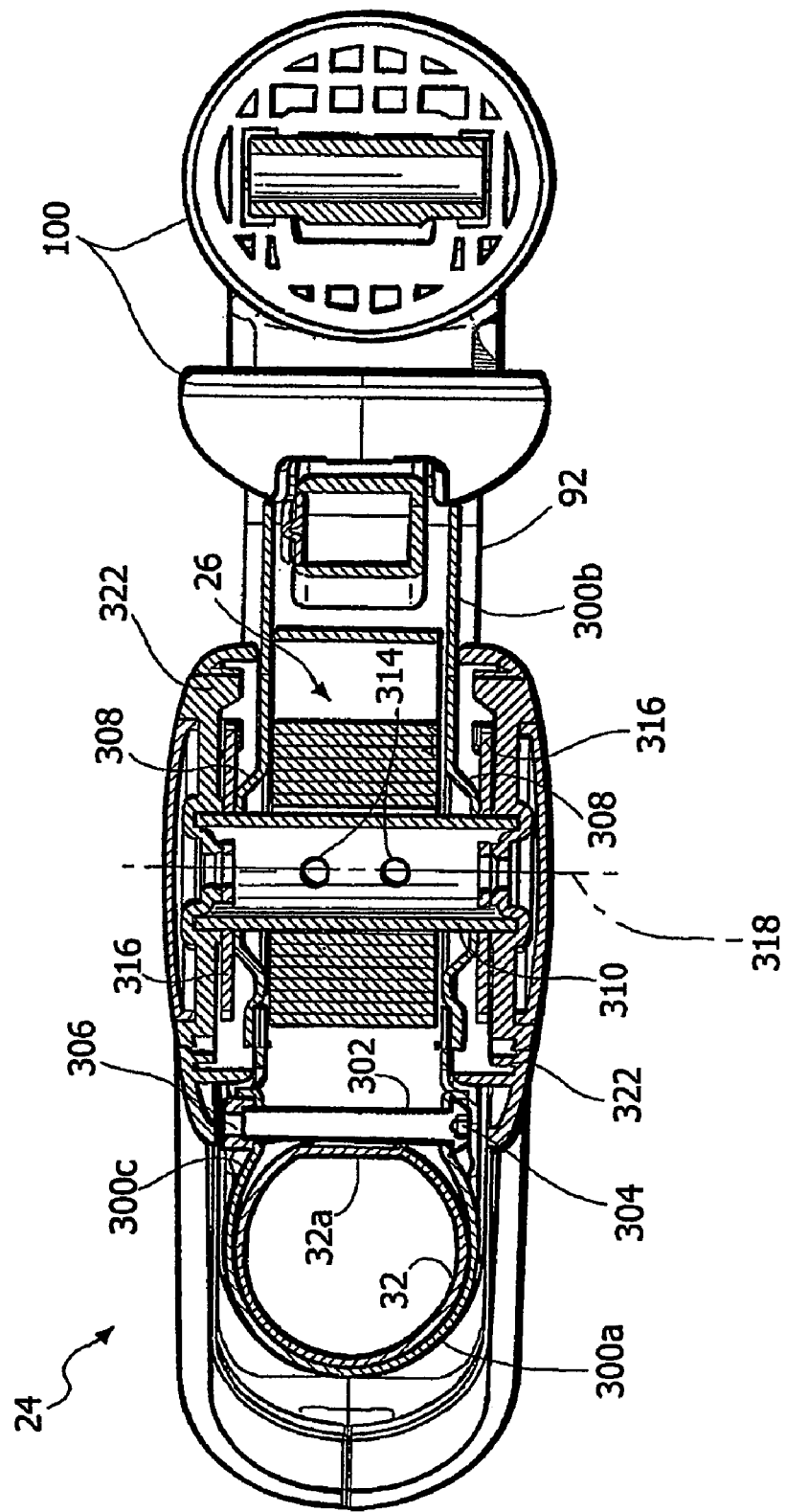
FIG. 19 is a cross-section taken along line XIX-XIX of FIG. 18.

With reference in particular to FIGS. 17, 18, a main difference with respect to the carrier of the first embodiment lies in that each of the two straps 26 is stored in a wound configuration within the body of the respective support 24 when not in use.

Figure 27:
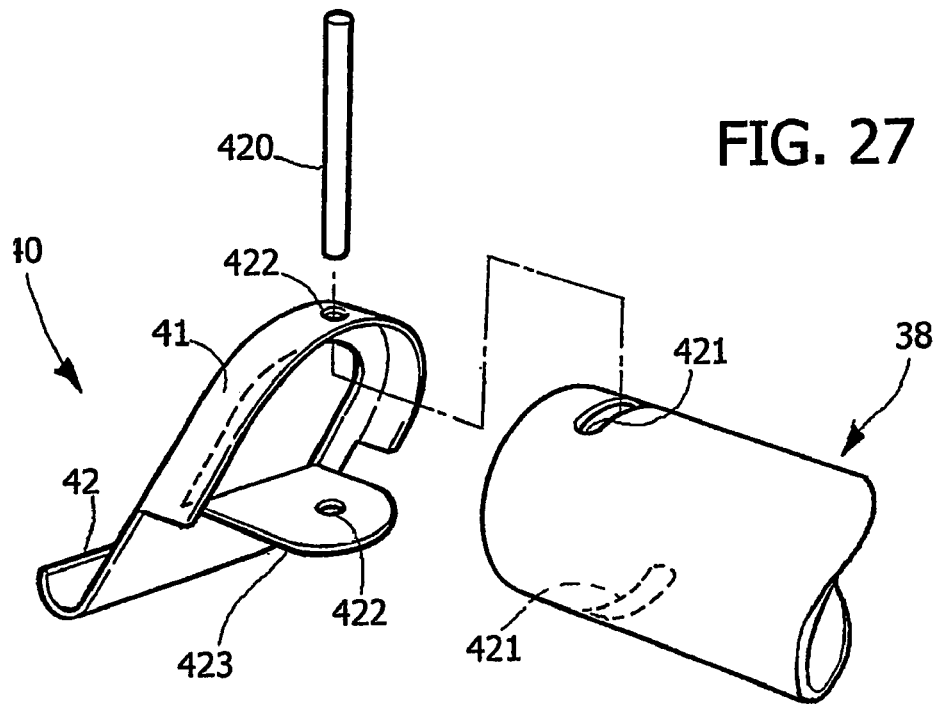
FIG. 27 shows a perspective exploded view of the lower hook arrangement of the carrier, according to a preferred embodiment.

With reference to FIG. 17, engagement member 40 includes a sleeve portion 41 which is freely rotatably mounted around the lower end 38 of the respective upright section 32. A rivet 420 (see FIG. 27) has its ends secured to two facing circular holes 422, one of which is formed at the top of sleeve portion 41, the other being formed in a tab 423 which is cut and bent away from the front wall of element 40 so as to engage the end portion 38 of the frame tube from below. The rivet is also engaged through two facing slots 421 formed on the upper and lower sides of tube end 38 and elongated in the circumferential direction. Thus, element 40 is able to perform a limited rotation around the axis of end portion 38, as well as a limited rotation around an axis orthogonal to the axis of the end portion 38 and substantially coincident with the axis of rivet 420. Due to these features, each hook 42 is able to perform slight rotations both around the axis of end portion 38 and an axis orthogonal thereto, in order to better engage the lower edge of the trunk lid or door, whatever is the configuration and orientation of this edge.

Still with reference to FIG. 17, contrary to the first embodiment, the upright section 32 is not provided with the forwardly facing spaced indentations 34 which have been shown in FIG. 1. In the case of the second embodiment each upright section 32 has only a forwardly facing flat wall 32a (see also FIG. 19). Each support 24 has a frame 300 which is formed by a U-bent metal sheet having a central portion 300a engaged around the respective section 32 and two parallel walls 300b which extend forwardly with respect to the section 32 from the central portion 300a (see FIGS. 15, 18 and 20). Each side wall of the frame 300 has a cut-away portion 300c adjacent to the central portion 300a (see FIGS. 15, 19). The two cut-away portions 300c can be tightened around section 32 in a clamp-like fashion by a screw 302 (FIG. 19) having a head 304 engaging one of the two portions 300c and screwed at the other end into a nut 306 associated to the other portion 300c. By loosening screw 304, the frame 300 of support 24 (FIG. 15) is free to slide along section 32 and can then be clamped at any desired position by tightening again screw 302. The two side walls 300b of frame 300 have outwardly deformed portions defining two bosses 308 (FIG. 19) having facing holes 310 around which a tubular roller 312 is freely rotatably mounted. The roller 312 is for winding the strap 26 within the body of support 24. To this end, one end of the strap 26 which is opposite to hook 104 is secured by two screws 314 to roller 312. As visible in FIG. 18, the strap 26 has no teeth formed thereon, contrary to the first embodiment described in the foregoing. In the case of the second embodiment, the strap 26 is preferably made of steel and coated with one of more layers of synthetic material.

With reference to FIGS. 18-21, two ratchet wheels 316, with one-way teeth 317, are secured on the two ends of roller 312 projecting outwardly from the side walls of frame 300.

As in the case of the first embodiment, a tensioning lever 110 is pivotably mounted to support 24 around the axis 318 of roller 312. As visible in FIG. 20, the body of tensioning lever 110 is defined by two half-shells 320. Also in this case the body of the tensioning lever 110 has an opening 113 shaped so as to receive the frame upright section 32 when tensioning lever 110 is raised and lowered by acting on the handle portion 112 of the lever 110. The pivotal mounting of lever 110 around axis 318 is obtained by means of two hub-like portions 322 of half-shells 320 which are rotatably mounted around the end portions of roller 312. Moreover, the half-shells 320 define a passage 324 (FIG. 20) for engagement of a screw (not shown) adjacent to the handle portion 112.

An engagement pawl 326 (FIG. 21) cooperates with each ratchet wheel 316. Each pawl 326 is pivotably mounted by a pin 328 on a respective hub-portion 322 of the body of the tensioning lever 110. A spring 330 is interposed between each pawl 326 and a wall of the hub-portion 322 in order to bias pawl 326 into engagement on the teeth 317 of ratchet wheel 316. Moreover, a retainer 332 cooperates with each ratchet wheel 316. Both retainers 332 are pivotally mounted by a common pin 334 to frame 300 of support 24. Each retainer 332 has teeth 336 engaging the teeth 317 of the respective ratchet wheel 316. The two retainers 332 are rigidly connected to the structure of a trigger member 338 (FIG. 18) which is thus swingable along with retainers 332 around the axis of common pin 334 with respect to the support frame 300. A spring 339 (having a shape similar to spring 122 of the first embodiment) is interposed between frame 300 and trigger member 338 in order to bias trigger member 338 into a rest position in which retainers 332 are engaged with the teeth of ratchet wheels 316.

The operation of the above described ratchet mechanism is as follows:

Supposing that the strap 26 is stored in the wound condition within support 24, the user must first of all grasp the end portion of the strap 26 carrying the hook 104 and pull the strap in order to unwind it from support 24 and bring hook 104 into engagement on the upper front edge of the vehicle door or trunk lid. As in the first embodiment, hook 104 is engaged on the upper edge of the trunk lid or door after lower hooks 42 have been engaged on the lower edge.

Unwinding of the strap 26 from the respective support 24 is accomplished when trigger member 338 is pressed. In order to do that, the user grasps the upright section 32 from behind at the level of support 24 and pulls trigger member 338 rearwardly by one or more fingers of his hand. By holding the trigger member 338 in the pulled condition, the retainers 332 (FIG. 21) are held in a disengaged condition with respect to the teeth of ratchet wheels 316. Moreover, with the tensioning lever 110 being in the lower position shown in FIG. 21, each pawl 326 is in the position shown in the same figure, close to retainer 332. Therefore, when retainers 332 are held in a condition spaced from the teeth 317 of wheel 316 by acting on trigger member 338, each pawl 326 is pushed by the respective retainer 332 to a position disengaged from teeth 317. In this condition the user is able to grasp the free end of strap 26 and pull it up to the desired length, causing unwinding of the strap from support 24. Rotation of wheels 316 during unwinding does not have any influence on lever 110, since the pawls 326 carried by lever 110 are disengaged from wheels 316 by the action of trigger member 338. Once the hook 104 has been engaged on the upper edge of the trunk lid or door, the trigger member 338 can be released, so that each retainer 332 and each pawl 326 return to the condition shown in FIG. 21. After that, the strap 26 can be tensioned by repeated raising and lowering movements of the tensioning lever 110. Each time that the lever 110 is raised (by a clockwise rotation with reference to FIG. 21) pins 328 and pawls 326 follow the lever in its rotation, so that the each pawl 326 moves away from the associated retainer 332 and causes rotation of the cooperating ratchet wheel 316. As visible in FIG. 18, the clockwise rotation of wheels 316 is transmitted to roller 312 thus causing winding of the strap 26 within support 24. During this rotation, the common pin 334 remains at its fixed position relative to support 24, and retainers 332 along with trigger member 338 repeatedly swing around pin 334 as a result of the movement of teeth 317 with respect to retainers 332.

Figure 20:
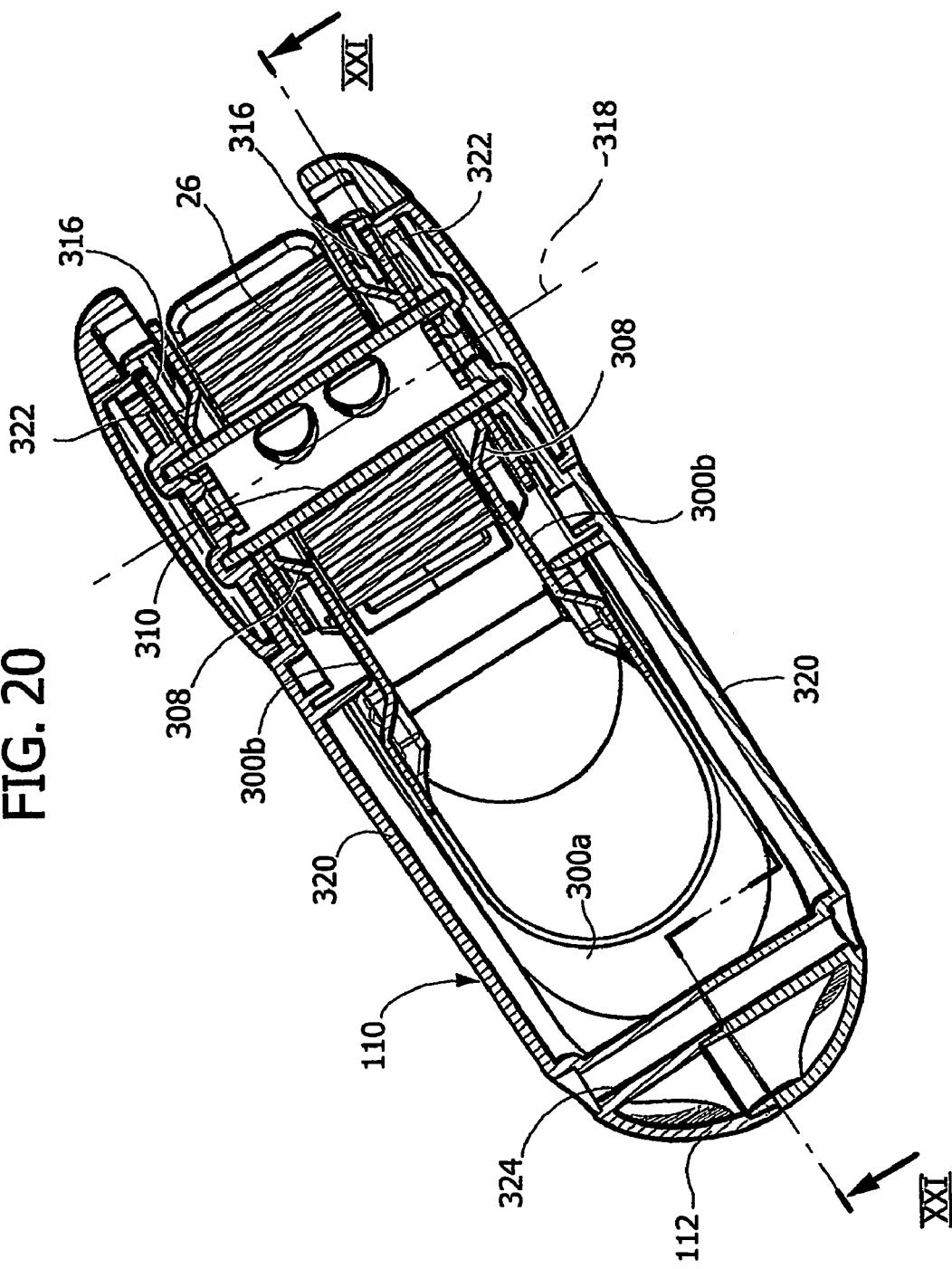
FIG. 20 is a cross-section taken along line XX-XX of FIG. 17.
Figure 21:
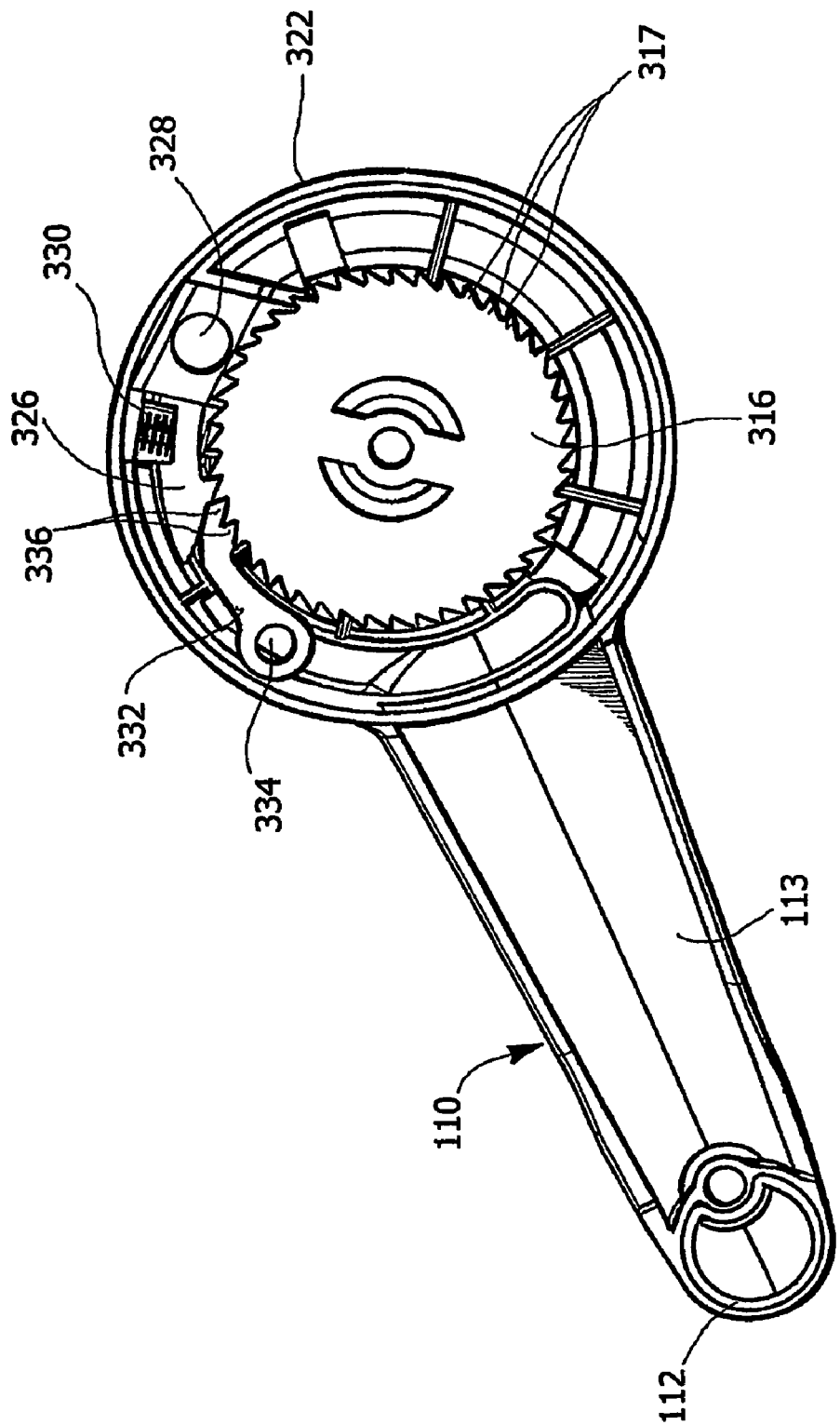
FIG. 21 is a cross-section taken along line XXI-XXI of FIG. 20.
Figure 22:
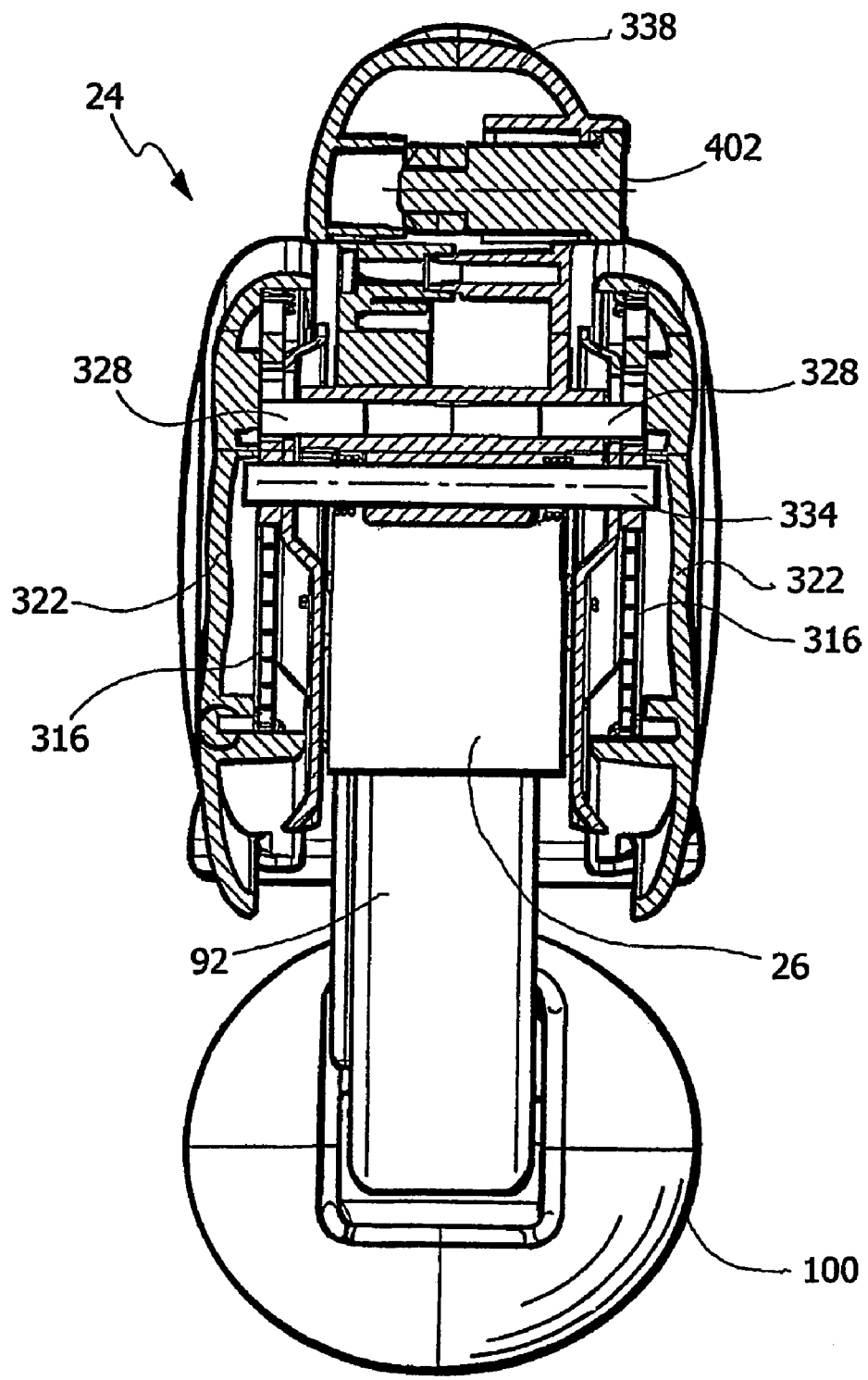
FIG. 22 is a cross-section taken along line XXII-XXII of FIG. 18, FIGS. 23,24 are partial rear and front views of the carrier of the second embodiment.
Figure 23:
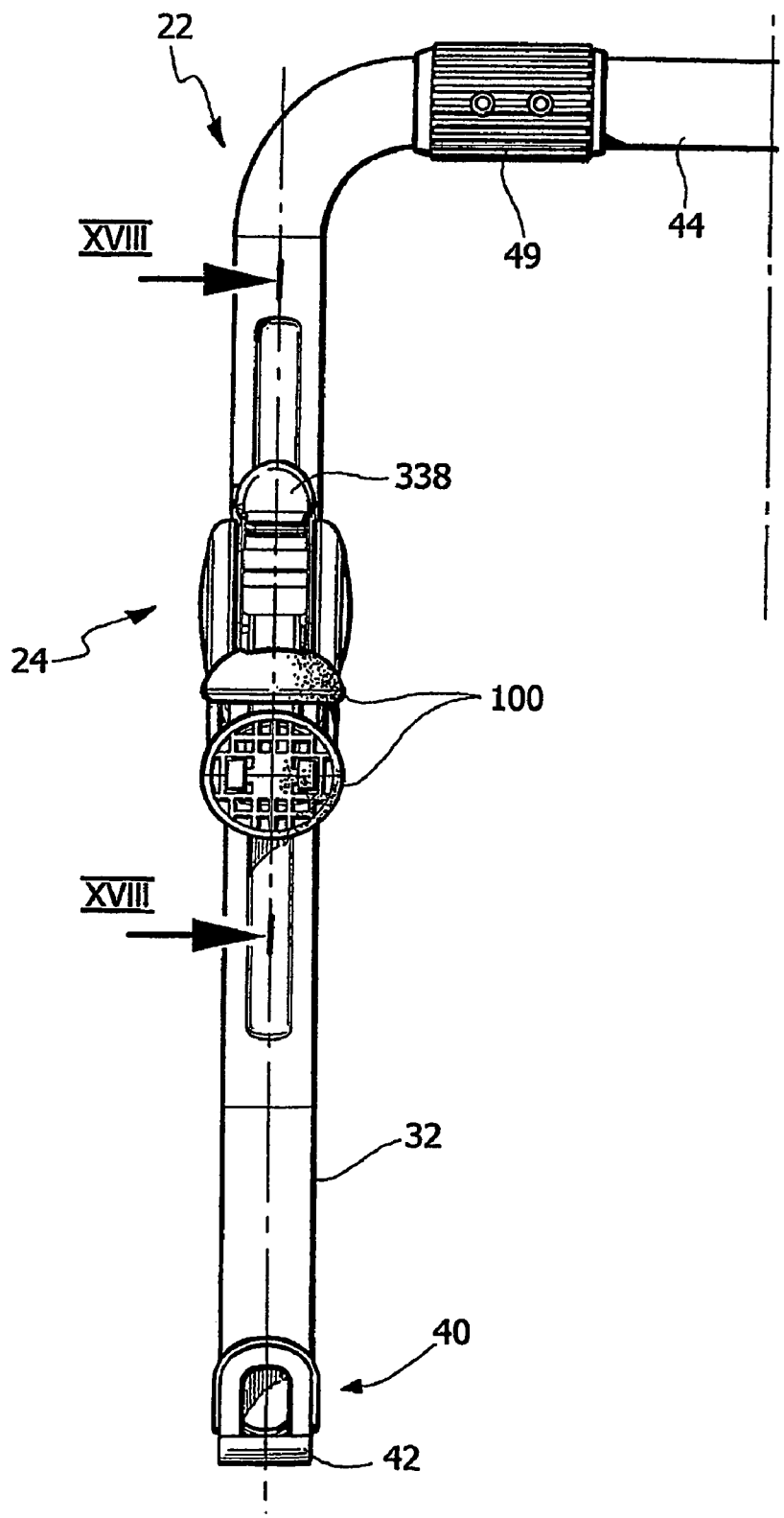
Figure 24:
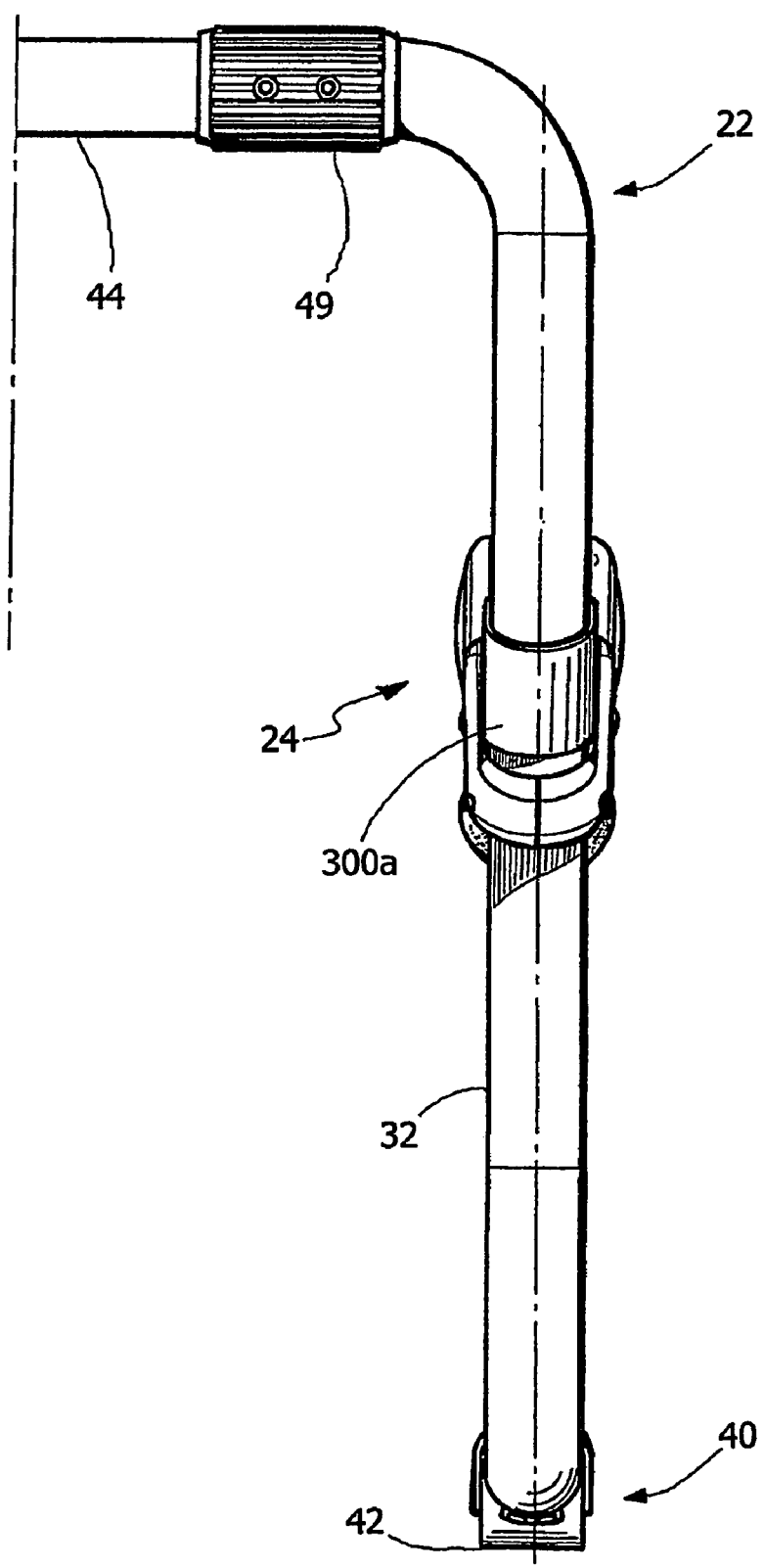

When the tensioning lever 110 is returned to its lower position, retainers 332 hold the cooperating wheels 316 in their previously reached position, whereas the two pawls 326 return to the position shown in FIG. 20 adjacent to retainers 332. During their return movement, the pawls 326 repeatedly swing around their respective pins 328 due to their movement with respect to the teeth 317 of wheels 316. By repeating the upward and downward movement of the tensioning lever 313 a sufficient number of times, the strap 26 can be tensioned as desired.

The trigger member 338 of each support 24 can be locked in its rested position by a key-operable lock 400 which acts on a lock member 402 (shown in FIG. 18). The lock member 402 can be moved between the horizontal position shown in FIG. 18 and a vertical position. In the horizontal position, the lock member 402 prevents actuation of the trigger member 338 by coming in contact against section 32. When the locking member 402 is moved to its vertical position, trigger member 338 can be actuated.

When the user wants to remove the carrier from the vehicle, he must actuate trigger member 338 in order to move retainers 332 to the raised position in which retainers 332 disengage pawls 326 from wheels 316. In this condition the strap 26 can be pulled a sufficient length in order to disengage hook 104 from the upper edge of the trunk lid or door. When this has been done, trigger member 338 can be released and the tensioning lever 110 can be repeatedly actuated in order to wind the strap 26 completely within the respective support 24.

Figure 25:
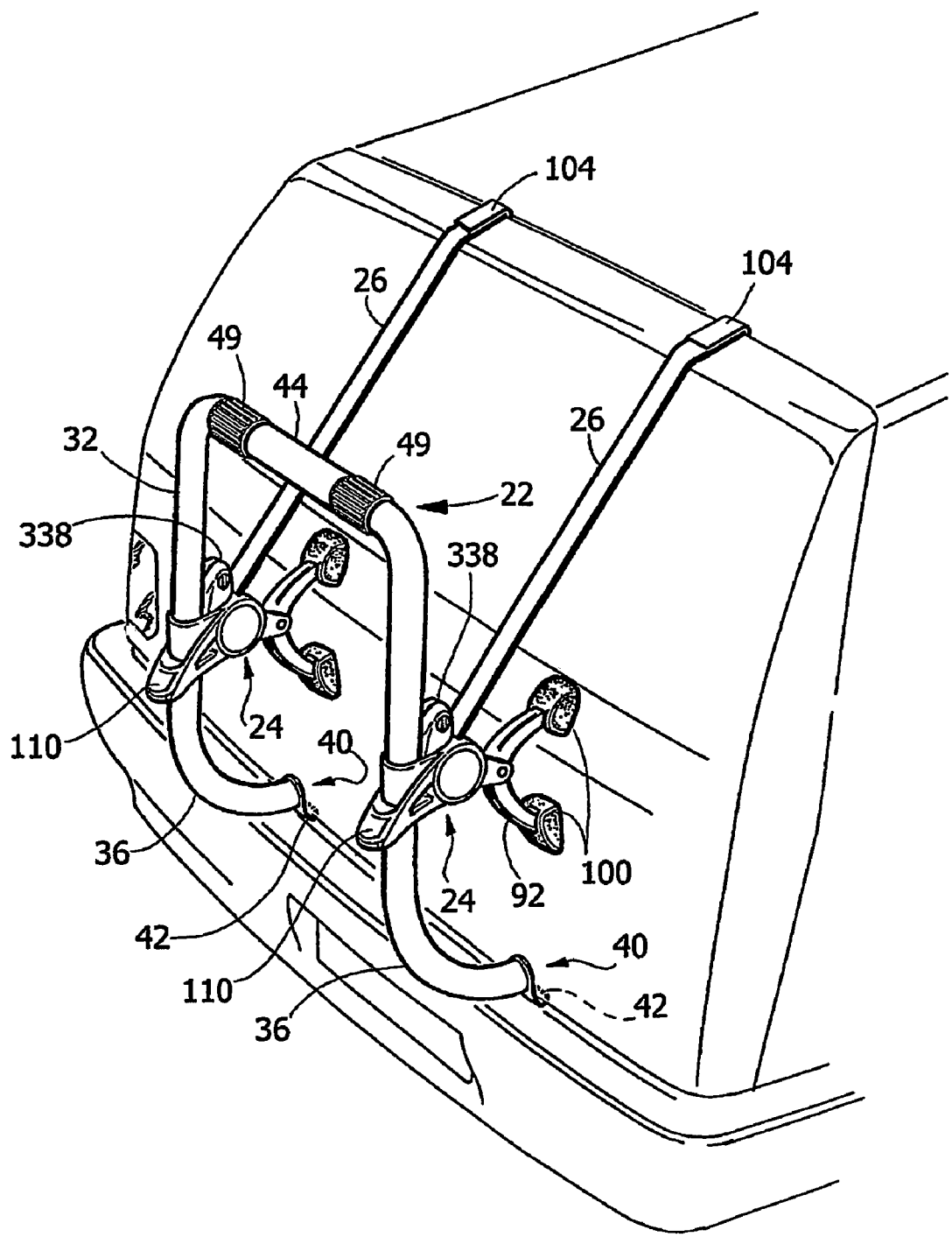
FIGS. 25,26 are perspective views showing the second embodiment in a mounted condition on a station-wagon and a sedan car respectively, where the ski support members and the bicycle support arms have been eliminated for better clarity of illustration.
Figure 26:
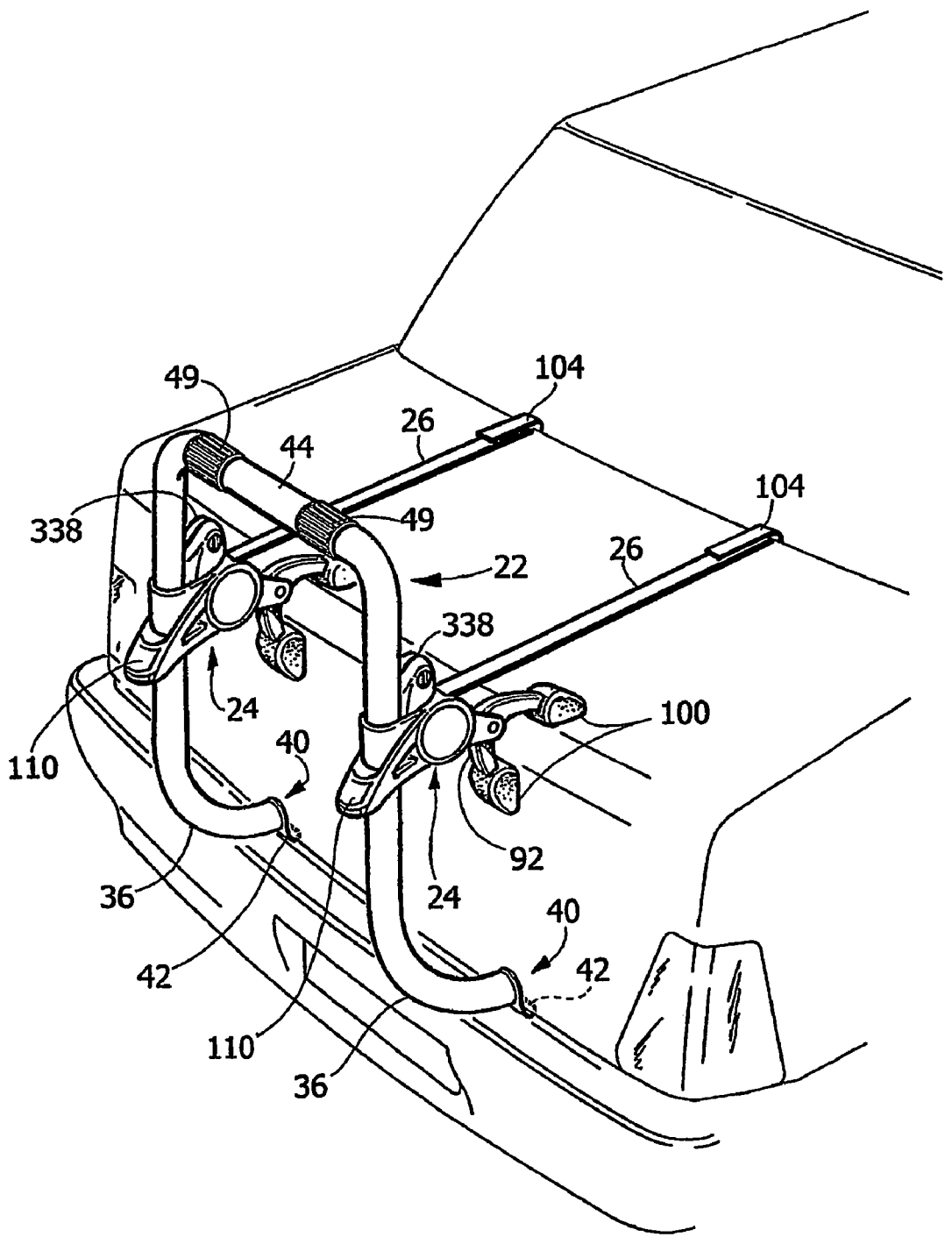

FIGS. 25, 26 are views similar to those of FIGS. 10, 11, showing the carrier according to the second embodiment mounted on a station wagon having a rear door and a sedan car having a trunk lid.

Again, also in this case, the arrangement of the engagement members 92 pivoted to supports 24 and carrying the swivel pads 100 causes the lower hooks 42 to be urged upwardly when the straps are tensioned even when the carrier is mounted on a trunk lid having a substantially horizontal upper surface, as in FIG. 26. As already discussed with reference to the first embodiment, this result is due to the tilting action around the axis of pivot pins 96 to which the frame of the carrier is subjected upon tensioning the straps.

Figure 14:
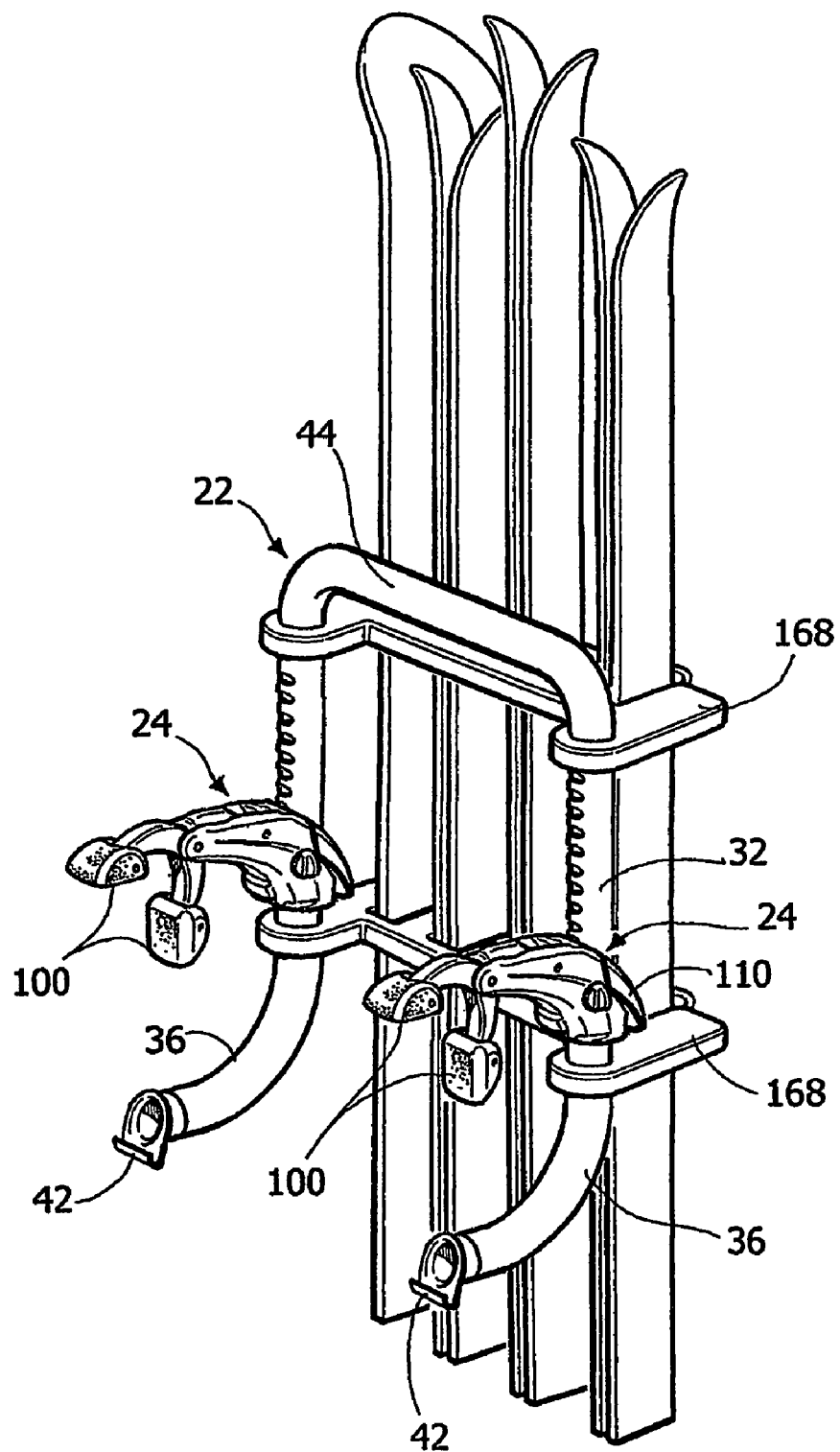
FIG. 14 shows a variant of FIG. 13.
Figure 15:
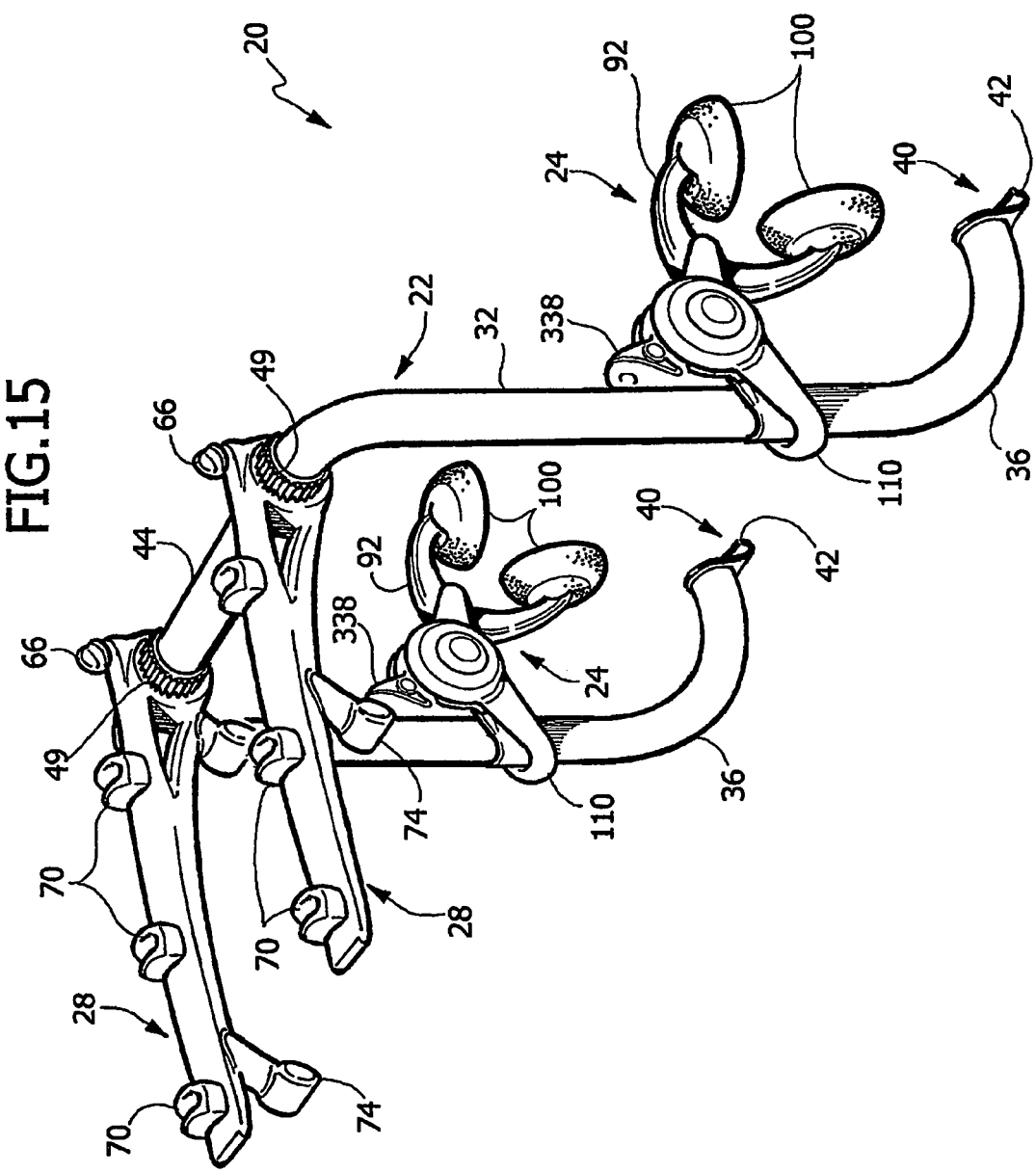
FIG. 15 is a perspective view of a second embodiment of the invention in a version adapted to be used as bicycle carrier.
Figure 16:
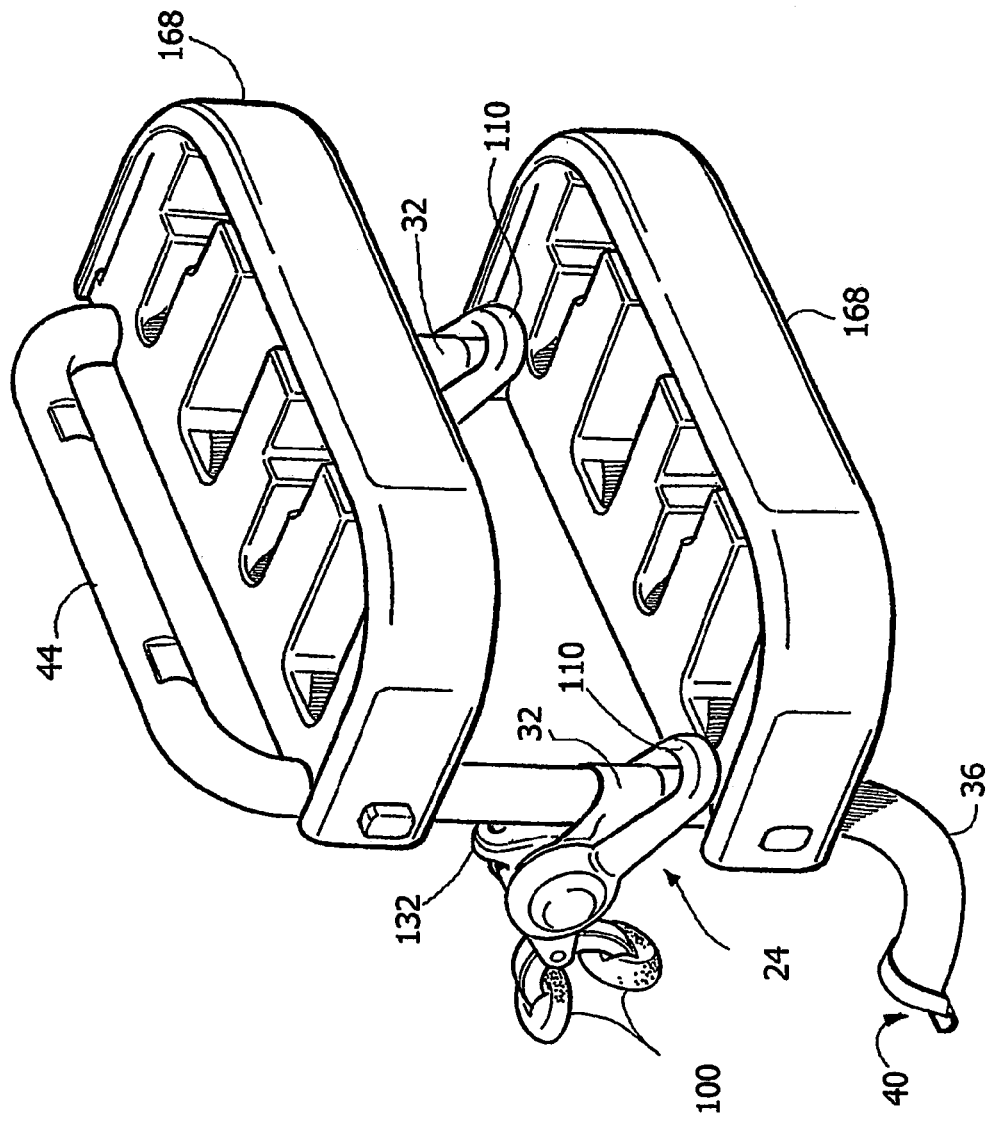
FIG. 16 is a perspective view of the second embodiment in a version adapted for ski transportation.

FIG. 16 shows the second embodiment in the form adapted for carrying skis, similarly to what has been shown in FIG. 14 with reference to the first embodiment.

Naturally, while the principle of the invention remains the same, details of the embodiments may widely vary with respect to what has been illustrated purely by way of example.

For instance, supports 24 hosting the strap winding means could be separated from further supports to which engagement members 92 could be mounted. Moreover, the means for tensioning the straps could be in form of a ratchet mechanism of a type different from that described herein by way of example, or it could be also in form of any other mechanism, different from a ratchet mechanism. Also the member for controlling tensioning of the strap could be different from a swingable lever such as lever 110. For example, this member could be in form of a rotating handle or knob.

Furthermore, also the second embodiment can be arranged in order to transport the various items of equipment which have been shown with reference to the first embodiment, as well as also many other different items.

It is also understood that frame 22 may assume various other configurations and is not limited to the specific type of configuration as shown and described.

Figure 28:
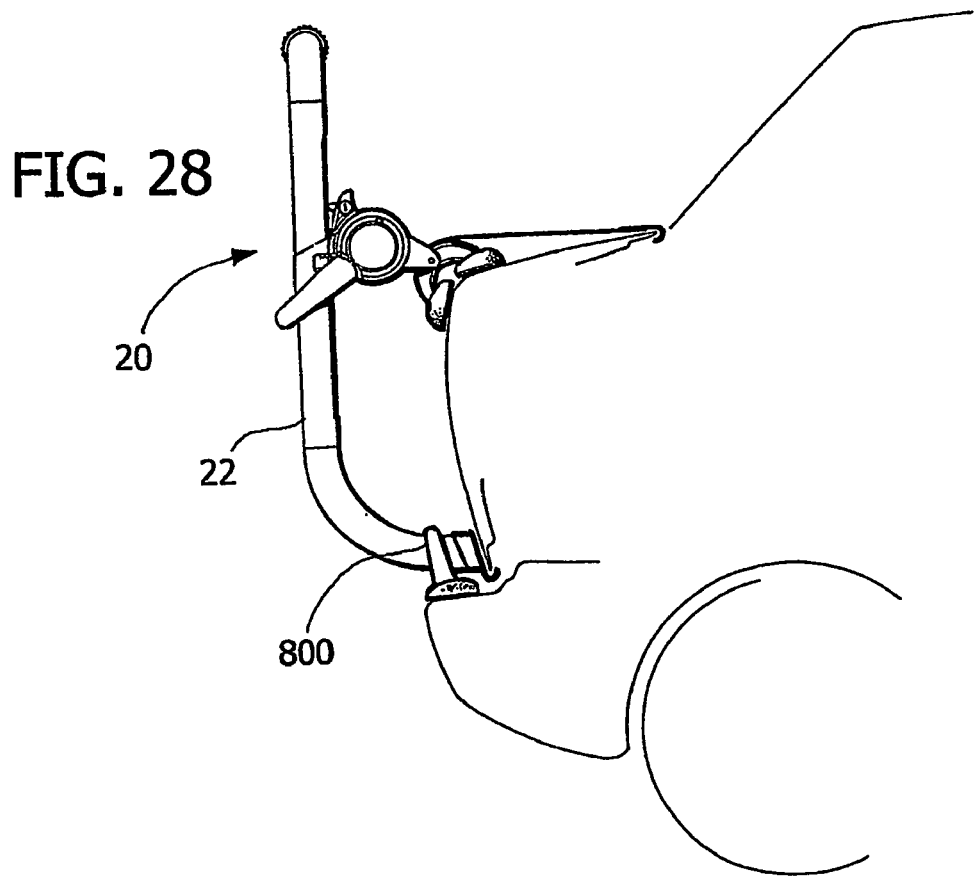
FIG. 28 shows a further variant of the carrier.

FIG. 28 of the drawings shows an arrangement of the carrier in which it is provided with an additional foot member 800 on each upright section of the frame, which can rest on the vehicle rear bumper to reduce the load applied to the lower edge of the rear door or lid, which may be advantageous particularly in cases where the carrier is used to transport relatively heavy items.

What is claimed is:

1. An equipment carrier arrangement, comprising:
   a movable rear vehicle component defining an upper edge and a lower edge, wherein the movable vehicle component is movable between an open position and a closed position; and
   an equipment carrier, comprising:
      a frame having a lower portion that includes a lower hook arrangement that is engaged with the lower edge of the movable vehicle component, wherein the lower hook arrangement prevents upward movement of the frame relative to the vehicle component;
      a structure connected to the frame or forming part thereof, for carrying one or more items of equipment;
      at least one support interconnected with the frame above the lower engagement means, wherein the at least one support extends from the frame toward the vehicle component; at least one pivotable vehicle engaging member;
      carried by the frame and located above the lower hook arrangement, wherein the vehicle engaging member is movably interconnected with the support at a location spaced from the frame toward the vehicle component, wherein at least a portion of the support is located between the vehicle engaging member and the frame, and wherein the vehicle engaging member is engaged with the vehicle component at a position above said lower edge of the movable vehicle component,
      a strap member having an upper hook arrangement engaged with the upper edge defined by the movable vehicle component,
      at least one support connected to the frame or forming part thereof, provided with strap engaging and tensioning means which are permanently engaged by said strap member, wherein said strap member constitutes an integral part of said carrier arrangement, whereby said carrier arrangement can be mounted on a vehicle with no need of additional separate strap members, and wherein said strap engaging and tensioning means can be controlled for tensioning the strap member in order to tighten said upper engagement means onto said upper edge of the vehicle component; and
   wherein the carrier is maintained in engagement with the movable vehicle component and is movable along with the movable vehicle component when the movable vehicle component is moved between the open position and a closed position via engagement of the lower hook arrangement with the lower edge of the movable vehicle component, engagement of the upper hook arrangement with the upper edge of the movable vehicle component, and engagement of the pivotable vehicle engaging member with the movable vehicle component at a location between the upper and lower edges of the movable vehicle component.

2. An equipment carrier arrangement, comprising:
   a movable rear vehicle component defining an upper edge and a lower edge, wherein the movable vehicle component is movable between an open position and a closed position; and
   an equipment carrier, comprising:
      a frame having lower engagement means engaged with the lower edge of the vehicle component, wherein engagement of the lower engagement means with the lower edge of the vehicle component prevents upward movement of the frame relative to the vehicle component;
      a structure connected to the frame or forming part thereof, for carrying one or more items of equipment;
      at least one support interconnected with the frame above the lower engagement means via an adjustable position engagement arrangement that enables adjustment in the vertical position of the support relative to the frame, wherein the at least one support extends from the frame toward the vehicle component;
      at least one vehicle engaging member carried by and movable with the support, wherein the vehicle engaging member is engaged with the vehicle component at a position between the lower edge and the upper edge of the vehicle component, and wherein the vehicle engaging member is movably interconnected with the support at a location spaced from the frame toward the vehicle component, wherein at least a portion of the support is located between the vehicle engaging member and the frame;
      a strap member having upper engagement means engaged with the upper edge of the vehicle component;
      strap engaging and tensioning means carried by and movable with the support, wherein said strap member is engaged with the strap engaging and tensioning means and can be controlled for tensioning the strap member in order to tighten said upper and lower engagement means onto said upper and lower edges, respectively, of the vehicle component;
   wherein the adjustable position engagement arrangement is configured and arranged to enable simultaneous adjustment in the vertical position of the vehicle engaging member and the strap engaging and tensioning means relative to the frame in order to vary the location of the strap member and the vehicle engaging member relative to the frame; and wherein the equipment carrier is maintained in engagement with the movable vehicle component and is movable with the vehicle component between the open and closed positions via engagement of the lower engagement means with the lower edge of the vehicle component, engagement of the upper engagement means of the strap member with the upper edge of the vehicle component, and engagement of the vehicle engaging member with the vehicle component between the upper and lower edges.

3. The carrier arrangement as set forth in claim 2, wherein said vehicle engaging member is mounted to said support via a pivot connection.

4. A carrier arrangement as set forth in claim 1, wherein said frame includes a pair of upright sections, a cross-member which interconnects upper ends defined by said upright sections and is provided with means for mounting the equipment-carrying structure, curved lower sections extending from the lower ends of the upright sections and terminating in forwardly facing ends, and a hook carrying member mounted to each of said forwardly facing ends and including a hook, wherein each hook is configured to engage a lower edge defined by the vehicle component.

5. The carrier arrangement as set forth in claim 2, wherein said strap engaging and tensioning means comprise a mechanism for holding the strap member in any set position relative to said support, a strap tensioning member for applying tension to said strap member, and a release control member for releasing said mechanism in order to enable free movement of the strap member relative to said support.

6. The carrier arrangement as set forth in claim 5, wherein said mechanism is a ratchet mechanism.

7. A carrier arrangement as set forth in claim 6, wherein said support has a through passage through which said strap member is engaged, said strap member having a series of one-way teeth, and wherein said ratchet mechanism includes a toothed strap retainer pivotally mounted to said support and elastically biased to a position in which its teeth engage the teeth of the strap member, so as to enable movement of the strap member in a tensioning direction and prevent movement of the strap member in a direction opposite the tensioning direction.

8. A carrier arrangement as set forth in claim 7, wherein said support has a split construction.

9. A carrier arrangement as set forth in claim 7, wherein said strap tensioning member is in form of a tensioning lever pivotally mounted on said support and having a series of one-way teeth engageable with said teeth of the strap member, said lever being operable to have an active tensioning movement from a first position to a second position, where it causes tensioning of the strap member, and an inactive return movement from the second position to the first position, during which the strap retainer holds the strap member in the previously reached position.

10. A carrier arrangement as set forth in claim 9, wherein said release control member is in form of a trigger member which can be actuated in order to move said strap retainer away from its position engaging the strap member.

11. A carrier arrangement as set forth in claim 9, wherein said support is mounted on an upright section forming part of the carrier frame, and wherein said tensioning lever is pivotally mounted to said support around an axis located forwardly of said upright section, and has a body extending rearwardly of the upright section, with a through passage through which the upright section is arranged.

12. A carrier arrangement as set forth in claim 11, wherein said release control member is in form of a trigger member arranged on said support forwardly of the upright section and operable by pulling it rearwardly.

13. An equipment carrier arrangement, comprising:
a movable rear vehicle component defining an upper edge and a lower edge, wherein the movable vehicle component is movable between an open position and a closed position; and
an equipment carrier, comprising:
a frame having lower engagement means engaged with the lower edge of the vehicle component, wherein the lower engagement means prevents upward movement of the frame relative to the vehicle component;
a structure connected to the frame or forming part thereof, for carrying one or more items of equipment;
at least one support interconnected with the frame above the lower engagement means, wherein the at least one support extends from the frame toward the vehicle component;
at least one vehicle engaging member secured to the support, wherein the vehicle engaging member is movably interconnected with the support at a location spaced from the frame toward the vehicle component, wherein at least a portion of the support is located between the vehicle engaging member and the frame, and wherein the vehicle engaging member is engaged with the vehicle component at a position between the lower edge and the upper edge of the vehicle component;
a strap member having upper engagement means for engagement with the upper edge of the vehicle component;
strap engaging and tensioning means secured to the support, wherein said strap member is secured to said strap engaging and tensioning means and wherein said strap engaging and tensioning means can be controlled for tensioning the strap member in order to tighten said upper and lower engagement means onto said upper and lower edges, respectively, of the vehicle component;
wherein the vehicle engaging member is secured to the support such that the support is located between the frame and the vehicle engaging member; and
wherein the equipment carrier is maintained in engagement with the movable vehicle component and is movable with the vehicle component between the open and closed positions via engagement of the lower engagement means with the lower edge of the vehicle component, engagement of the upper engagement means of the strap member with the upper edge of the vehicle component, and engagement of the vehicle engaging member with the vehicle component between the upper and lower edges.

14. A carrier arrangement as set forth in claim 13, wherein said support defines an interior within which the strap is stored in a wound configuration by the strap engaging means.

15. A carrier arrangement as set forth in claim 13, wherein said frame includes a pair of upright sections, a cross-member which interconnects upper ends defined by said upright sections and is provided with means for mounting the equipment-carrying structure, curved lower sections extending from the lower ends of the upright sections, and terminating in forwardly facing ends, and a hook carrying member mounted to each of said forwardly facing ends and including a hook, wherein each hook is configured to engage a lower edge defined by the vehicle component.

16. A carrier arrangement as set forth in claim 13, wherein said strap engaging and tensioning means is in the form of strap winding means.

17. A carrier arrangement as set forth in claim 16, wherein the strap winding means comprises a mechanism for holding the strap winding means in any set condition, a strap tensioning member for controlling the mechanism in order to apply a tension to the strap member, and a release control member to release the mechanism in order to enable unwinding of the strap member from said strap winding means.

18. A carrier arrangement as set forth in claim 17, wherein said mechanism is a ratchet mechanism.

19. A carrier arrangement as set forth in claim 18, wherein said strap winding means include includes a strap winding roller rotatably mounted to said support, on which the strap member can be wound, and wherein said ratchet mechanism includes at least one ratchet wheel carried by said winding roller and having a series of one-way teeth, and a retainer having a series of teeth which is pivotally mounted to said support and elastically biased to a position in which the teeth of the retainer engage the teeth of the ratchet wheel, so as to enable a rotation of the wheel in a strap winding tensioning direction and preventing an opposite rotation of the wheel.

20. A carrier arrangement as set forth in claim 19, wherein said strap tensioning member is in form of a lever pivotally mounted on said support and provided with a toothed pawl pivotally connected to said tensioning lever and elastically biased to a position in which it engages the teeth of the ratchet wheel, said lever being operable to have an active movement from a first position to a second position, in which said pawl causes rotation of the ratchet wheel in the strap winding tensioning direction, and an inactive return movement from the second position to the first position, during which the retainer holds the ratchet wheel in the previously reached position.

21. A carrier arrangement as set forth in claim 20, wherein said release control member is in form of a trigger member which can be actuated in order to move said retainer away from its position engaging the ratchet wheel.

22. An equipment carrier arrangement, comprising:
   a movable rear vehicle component defining an upper edge and a lower edge, wherein the movable vehicle component is movable between an open position and a closed position; and
   an equipment carrier, comprising:
      a frame having an upper portion and a lower portion, wherein the lower portion of the frame includes a lower hook arrangement that is engaged with the lower edge of the movable vehicle component, wherein the frame and the lower hook arrangement are configured such that engagement of the lower hook arrangement with the lower edge of the movable vehicle component is operable to rigidly connect the lower portion of the frame to the movable vehicle component and prevent upward movement of the frame relative to the vehicle component;
      a structure connected to the frame or forming part thereof, for carrying one or more items of equipment;
      at least one support interconnected with the frame above the lower engagement means, wherein the at least one support extends from the frame toward the vehicle component; at least one vehicle engaging member;
      connected to the frame, wherein the vehicle engaging member is located above the lower hook arrangement and is engaged with the movable vehicle component at a position above said lower edge of the movable vehicle component, wherein the vehicle engaging member is pivotally interconnected with the support via a pivot connection that defines a transverse pivot axis at a location spaced from the frame toward the vehicle component, and wherein at least a portion of the support is located between the vehicle engaging member and the frame; and
      a strap member interconnected with the frame via a strap member support, wherein the strap member includes upper engagement means engaged with the upper edge defined by the movable vehicle component;
      strap engaging and tensioning means carried by the frame, wherein said strap member is secured to said strap engaging and tensioning means and wherein said strap engaging and tensioning means can be controlled for tensioning the strap member in order to tighten said upper engagement means onto said upper edge of the vehicle component,
      wherein tensioning the strap member via the strap engaging and tensioning means induces a tilting action on said frame around said transverse pivot axis which causes the lower hook arrangement of said frame to be urged against the lower edge of the movable vehicle component so as to clamp the movable vehicle component between the upper engagement means of the strap member and the lower hook arrangement of the frame;
      wherein the equipment carrier is maintained in engagement with the movable vehicle component and is movable with the vehicle component between the open and closed positions via engagement of the lower hook arrangement with the lower edge of the vehicle component, engagement of the upper engagement means of the strap member with the upper edge of the vehicle component, and engagement of the vehicle engaging member with the vehicle component between the upper and lower edges.

23. A carrier arrangement as set forth in claim 22, wherein the lower hook arrangement is interconnected with a forwardly facing end defined by the lower portion of said frame so as to be able to perform a limited rotation with respect to said forwardly facing end.

24. A carrier arrangement as set forth in claim 22, wherein said frame includes a pair of upright sections, a cross-member which interconnects upper ends defined by said upright sections and is provided with means for mounting the equipment-carrying structure, curved lower sections extending from the lower ends of the upright sections, and terminating in forwardly facing ends, and a hook carrying member mounted to each of said forwardly facing ends and including a hook, wherein each hook is configured to engage a lower edge defined by the vehicle component.

25. A carrier arrangement as set forth in claim 22, wherein said frame comprises a pair of upright sections and a cross member extending therebetween, and wherein the structure for carrying the one or more items of equipment is interconnected with said cross-member via an array of angularly spaced axial ridges arranged around the cross-member and extending longitudinally therealong, and wherein the structure for carrying the one or more items of equipment includes at least one equipment carrying arm having a hub section with an inner surface having an array of longitudinal angularly spaced teeth which are engageable with said ridges, to connect said arm to said cross-member at different desired orientations.

26. A carrier arrangement as set forth in claim 25, wherein said hub section has a split construction.

27. A carrier arrangement as set forth in claim 25, wherein said equipment carrying structure is selected among a number of different structures adapted to carry different items of equipment, such as bicycles, skis, snowboards, pieces of luggage.

28. A carrier arrangement as set forth in claim 25, wherein said ridges are formed on an engagement member surrounding said cross-member.

29. A carrier arrangement as set forth in claim 28, wherein said engagement member surrounding the cross-member has a split construction.

30. A carrier arrangement as set forth in claim 22, wherein said vehicle engaging member is in form of a rocking member having a mid portion pivotally supported around said pivot axis by said frame and two end portions to which vehicle engaging feet are pivotally connected.

31. A carrier arrangement as set forth in claim 30, wherein said rocking member is U-shaped.

32. A carrier arrangement as set forth in claim 31, wherein said frame includes at least one upright section, and wherein said strap member support is mounted on said upright section by connecting means enabling an adjustment of the position of said support along said upright section.

33. A carrier arrangement as set forth in claim 32, wherein each upright section has spaced indentations selectively engageable by said connecting means.

34. A carrier arrangement as set forth in claim 32, wherein said connecting means comprises clamp means carried by said support and adapted to be tightened around said upright section at any position thereof by means of a tightening screw.

35. A carrier arrangement as set forth in claim 34, wherein each upright section has a forwardly facing flat surface engageable by said tightening screw of said clamp means in order to prevent rotation of the support relative to the upright section.

36. A carrier arrangement as set forth in claim 34, wherein said support has a supporting structure in form of a U-bent metal sheet surrounding a rearwardly facing portion of the upright section and having two cut-away portions defining said clamp means, which are engageable by said tightening screw forwardly of said upright section.

* * * * *

UNITED STATES PATENT AND TRADEMARK OFFICE
CERTIFICATE OF CORRECTION

| | | |
|---|---|---|
| PATENT NO. | : 7,866,517 B2 | Page 1 of 1 |
| APPLICATION NO. | : 10/533170 | |
| DATED | : January 11, 2011 | |
| INVENTOR(S) | : Fabio Pedrini | |

It is certified that error appears in the above-identified patent and that said Letters Patent is hereby corrected as shown below:

ON THE TITLE PAGE
Insert Item [63]:

-- Related U.S. Application Data    [63] Provisional application No. 60/422,551, filed on October 31, 2002. --.

CLAIM 1, column 11, lines 49-50, after "member" delete " ; {paragraph return}";

CLAIM 4, column 13, line 1, delete "1" and substitute -- 2 --;

CLAIM 19, column 15, line 14, delete "include";

CLAIM 22, column 15, lines 63-64, after "member" delete " ; {paragraph return}".

Signed and Sealed this
Nineteenth Day of April, 2011

David J. Kappos
*Director of the United States Patent and Trademark Office*